United States Patent [19]

Sawada et al.

[11] Patent Number: 5,488,490
[45] Date of Patent: Jan. 30, 1996

[54] IMAGE READING APPARATUS FOR READING IMAGES RECORDED ON FILM

[75] Inventors: Kenji Sawada, Machida; Yashushi Yamade, Sagamihara; Sei Onuma, Tokyo, all of Japan

[73] Assignee: Minolta Camera Kabushiki Kaisha, Osaka, Japan

[21] Appl. No.: 857,315

[22] Filed: Mar. 25, 1992

[30] Foreign Application Priority Data

Mar. 26, 1991 [JP] Japan .................................. 3-061424
Mar. 26, 1991 [JP] Japan .................................. 3-061426
Aug. 27, 1991 [JP] Japan .................................. 3-215405

[51] Int. Cl.$^6$ ........................................ H04N 1/04
[52] U.S. Cl. ...................... 358/487; 358/483; 358/474; 358/494; 358/496
[58] Field of Search ........................... 358/487, 483, 358/482, 474, 494, 496, 497, 451, 443, 214, 408, 480; 250/239; 348/49, 47, 129

[56] References Cited

U.S. PATENT DOCUMENTS

| 4,009,388 | 2/1977 | Seachman | 358/474 |
|---|---|---|---|
| 4,429,333 | 1/1984 | Davis et al. | 358/483 |
| 4,791,306 | 12/1988 | Tokumitsu | 358/474 |
| 4,866,532 | 9/1989 | Ayata et al. | 358/443 |
| 5,113,268 | 5/1992 | Yoshida et al. | 358/474 |
| 5,132,810 | 7/1992 | Kishida | 358/451 |
| 5,216,521 | 6/1993 | Lant | 358/496 |

FOREIGN PATENT DOCUMENTS 56-144668 11/1981 Japan .
60-116273 6/1985 Japan .

Primary Examiner—Edward L. Coles, Sr.
Assistant Examiner—Fan Lee
Attorney, Agent, or Firm—Burns, Doane, Swecker & Mathis

[57] ABSTRACT

An image reading apparatus is provided with a photoelectric conversion element to be irradiated with the projected light of an original image photographed on a film and is adapted to read out the image. The component lines of the image information in the direction of main scanning are halved by a half mirror and the corresponding halved portions of the image information are simultaneously read out by a first line sensor and a second line sensor. These line sensors are disposed in mutually equivalent positions relative to the half mirror. The direction of motion of the film perpendicular to the direction of main scanning relative to the line sensors is selected between a first direction of motion and a second direction of motion opposite to the first direction of motion. From these line sensors, the image information is produced in the order in which the image information was read out, no matter whichever of the two directions may be selected. These line sensors are disposed on supporting members in such a manner that they may be freely moved in the direction of main scanning and the direction of auxiliary scanning. These line sensors are fastened to the supporting members of their own by means of screw members. When the screw members are rotated, their rotations are not transmitted to the line sensors.

18 Claims, 23 Drawing Sheets

IMAGE READING APPARATUS FOR READING IMAGES RECORDED ON FILM

BACKGROUND OF THE INVENTION

1. Field of the Invention

This invention relates to an image reading apparatus for reading image information recorded on a film such as a microfilm.

2. Description of the Related Art

For the purpose of enabling image information photographed on a film such as a microfilm to be reproduced on a recording paper, a system which reads out the image information with a line sensor provided with CCD elements, converts the image information into electronic information, forwards the signal of electronic information to a printer, and prints the image on the recording paper has been available. This system has the advantage that clusters of image imformation read out by a plurality of image reading apparatuses can be printed by shared use of one printer. Each image reading apparatus incorporated in this system is provided with a memory part capable of provisionally storing the signal from the CCD elements. The image information stored in the memory part is sequentially transmitted to the printer. The line sensor provided with the CCD elements comes in two types, the type called a contact CCD sensor having a size equaling the width of the recording paper on which the image information is to be reproduced, namely the length corresponding to the size of the recording paper in the main scanning direction and the type called a reduced CCD sensor having CCD elements arranged in a high density and having a length smaller than the width of the recording paper to be used for the reproduction of the image information.

In recent years, the desirability of developing a system which enables information recorded on a film such as a 35-mm film to be reproduced on a relatively large recording paper of the A2 or A1 size has been finding growing recognition. When an image is to be reproduced on such a large recording paper as mentioned above at a resolution of 400 dpi (dots per inch), the reading speed is slow and the operational efficiency is inferior no matter whichever of the reduced and contact type of CCD sensor may be adopted. The signals from the multiplicity of CCD elements of which one sensor is formed are destined to be transmitted to the memory part. The memory part thus used, therefore, is required to have a large capacity. As a result, the cost for the production of the sensor is high and the large volume of image data from the sensor must be processed within the memory part. The reading speed is proportionately slow and the reproduction of an image on the recording paper of a large size is obtained only with difficulty.

When image information is to be printed on the recording paper of a large size, the recording paper on which the printing has been completed is subjected to the work of automatic folding by the use of a paper folding device. On account of the procedure involved in the paper folding device, it possibly becomes necessary for the film having pertinent information recorded thereon to be rotated so that the image to be reproduced on the recording paper during the process of printing will be directed as required. There are times when such additional information as a date is printed in one of the four corners of the recording paper at the same time that the image information is printed on the recording paper. When the part for printing the additional information is set apart only on one side in the direction of width of the recording paper, the printing of the information is obtained on one terminal side of the recording paper.

For the elimination of this disadvantage, the alteration of the output of printing in any desired direction is accomplished by the practice of optically reading image information recorded on the film by means of a sensor and committing the resultant image signals wholly to an image memory and processing these signals therein. When this method is relied on to effect the alteration of the direction of the output of printing mentioned above, the processing of the image requires use of a memory. Thus, the cost of production of the apparatus is proportionately increased and the processing itself is suffered to consume time. The printing, therefore, cannot be performed quickly and the apparatus cannot be operated efficiently.

SUMMARY OF THE INVENTION

An object of this invention is to provide an image reading apparatus which is capable of quickly reading out image information to be reproduced on a recording paper of a large size without increasing the cost of production.

Another object of this invention is to provide an image reading apparatus which is capable of quickly reading out image information and altering the direction of output of the image relative to the recording paper and, therefore, is excellent in operational efficiency.

In accordance with the present invention, there is provided an image reading apparatus comprising image projecting means for projecting a beam of light containing image information of a prescribed line from an original, a separating member for separating said beam of light projected by said image projecting means into a first direction and a second direction, a first image reading member for reading out said prescribed line contained in the beam of light separated into said first direction by said separating member, and a second image reading member disposed at an equivalent position to said first image reading member relative to said separating member and adapted to read out said prescribed line contained in the beam of light separated into said second direction by said separating member.

Further in accordance with the present invention there is provided an image reading apparatus comprising an image reading member provided with a plurality of photoelectric conversion elements arranged in a linear state, a first supporting member for supporting said image reading member, a second supporting member for movably supporting said first supporting member, adjusting means for adjusting the position of said first supporting member relative to said second supporting member, a mixing member for fixing said first supporting member to said second supporting member, and a regulating member interposed between said first supporting member and said fixing member and adapted to regulate the transmission of motion of said fixed member relative to said first supporting member.

In accordance with this invention, the main scanning line on an image is divided into two equal halves and two corresponding halves of the image are simultaneously read out by two separate line sensors. The two sets of image information one each from the separate line sensors are processed by separate image processing parts and the two sets of processed image information from these sensors are synthesized and then transmitted as one set of synthesized image information to a printer. This system, therefore, notably enhances the speed of processing and expedites the scanning for the reading of the image. Further, the relative motion of the line sensors and the image-containing film mentioned above in the direction of auxiliary scanning perpendicular to the direction of main scanning along the line sensors for the purpose of reading an image is selectively obtained in a first direction of motion or in a second direction of motion opposite to the first direction of motion so that the portions of the image read out in either of the directions are sequentially reproduced in the order in which they are read out by reading means. Thus, the image on the film can be read out in the two directions without requiring use of a memory of a large capacity. Now that alteration of the direction of output of the image can be attained by altering the direction of image reading wothout using a memory as described above, the reading of the image can be obtained quickly and the operational efficiency of the apparatus can be notably improved.

DESCRIPTION OF THE PREFERRED EMBODIMENTS

This image reading apparatus is charged with a film of the type attached on what is called an aperture card, i.e. a rectangular card having a window hole formed therein by perforation. The image reading apparatus of the type so adapted as to read out image information which is recorded on this particular type of film is illustrated.

Figure 1:
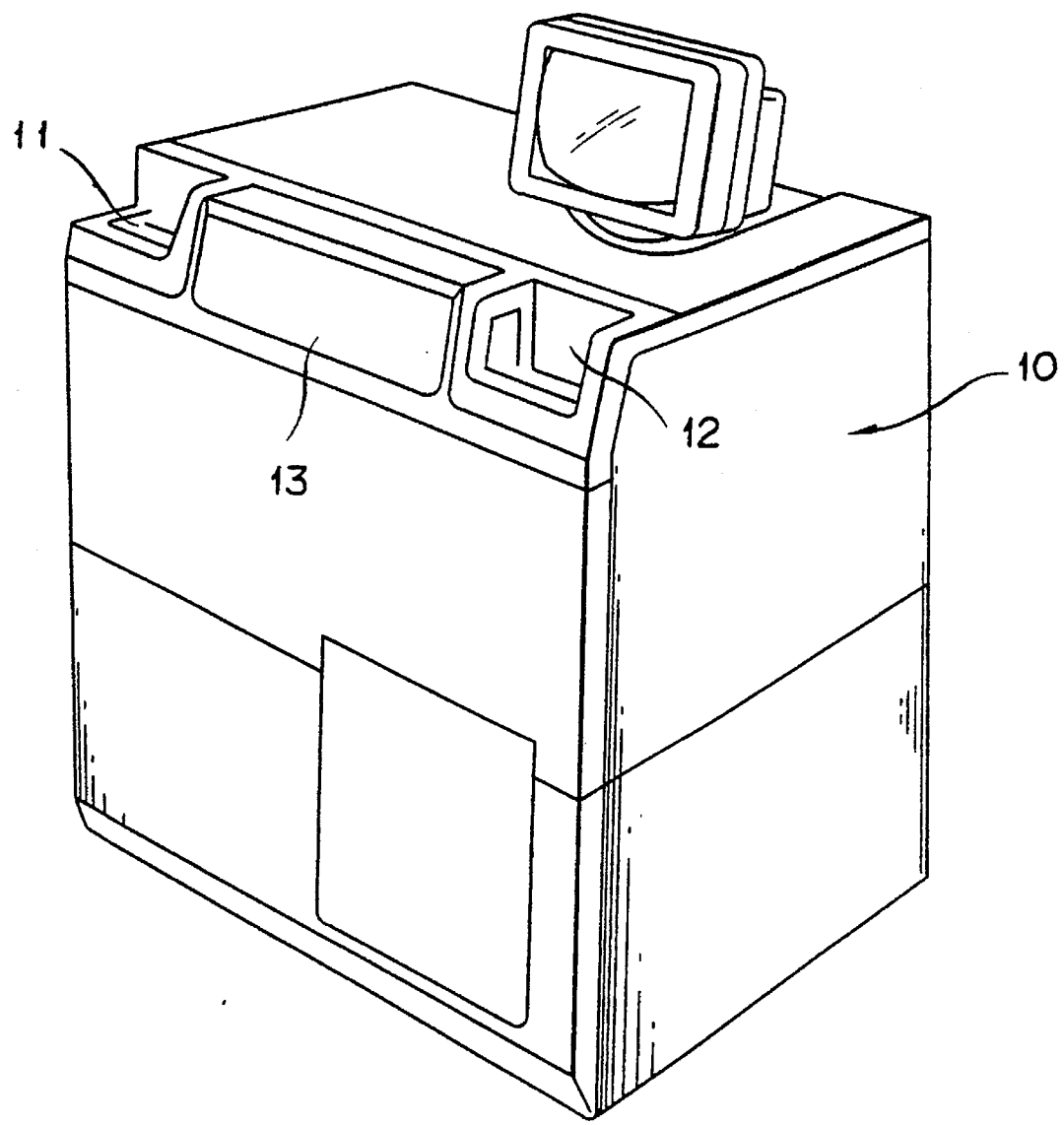
FIG. 1 is a perspective view of the appearance of an image reading apparatus as one embodiment of this invention.

As illustrated in FIG. 1, a housing 10 of the main body of the apparatus is provided on the opposite sides of the front surface thereof with a card insertion mouth 11 and a card extraction mouth 12. An open-shut lid 13 is interposed between these mouths. This open-shut lid 13 is opened to afford access to the site of a jam caused when the aperture card is stuck.

Figure 2:
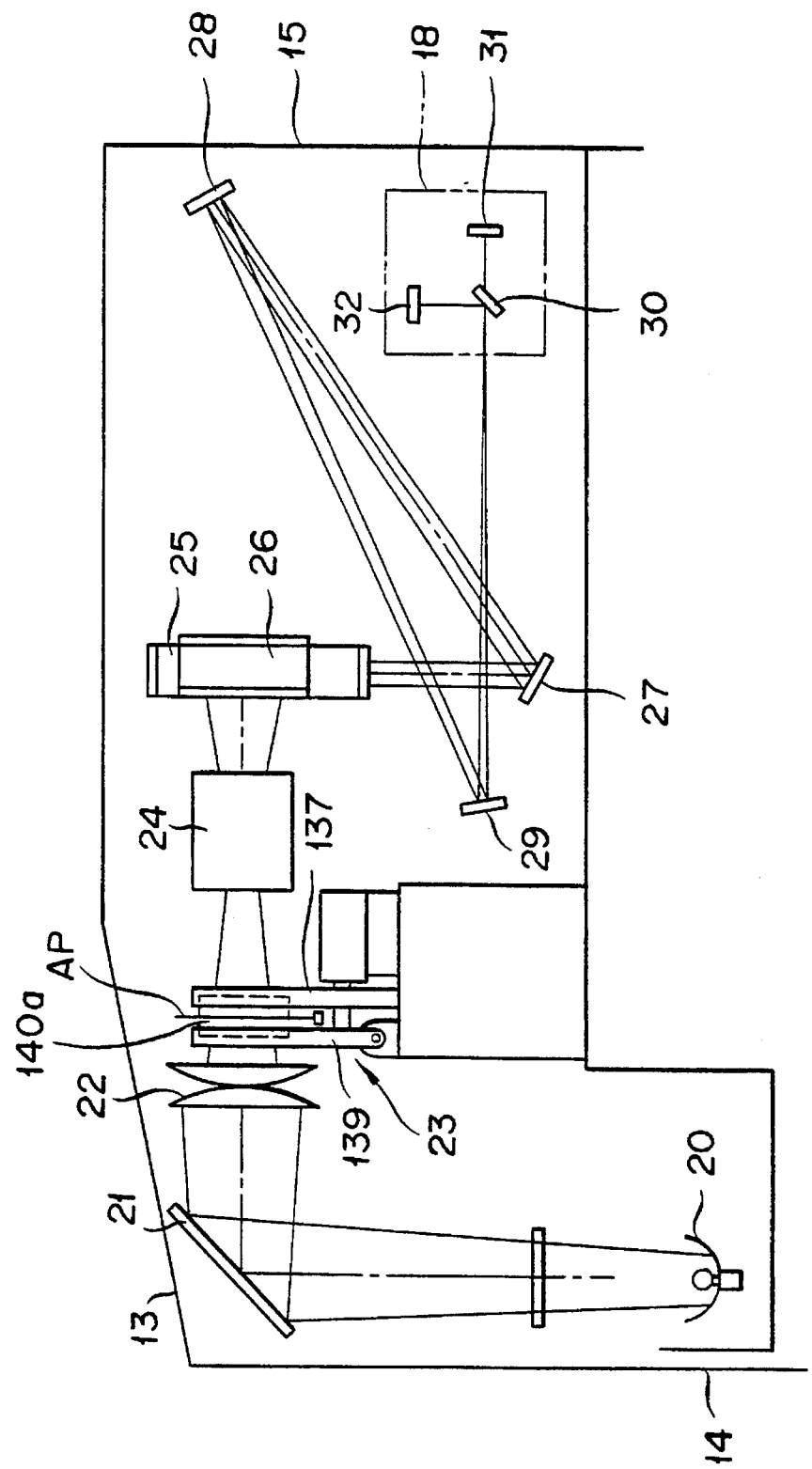
FIG. 2 is a cross section illustrating the inner construction of the image reading apparatus shown in FIG. 1.
Figure 3:
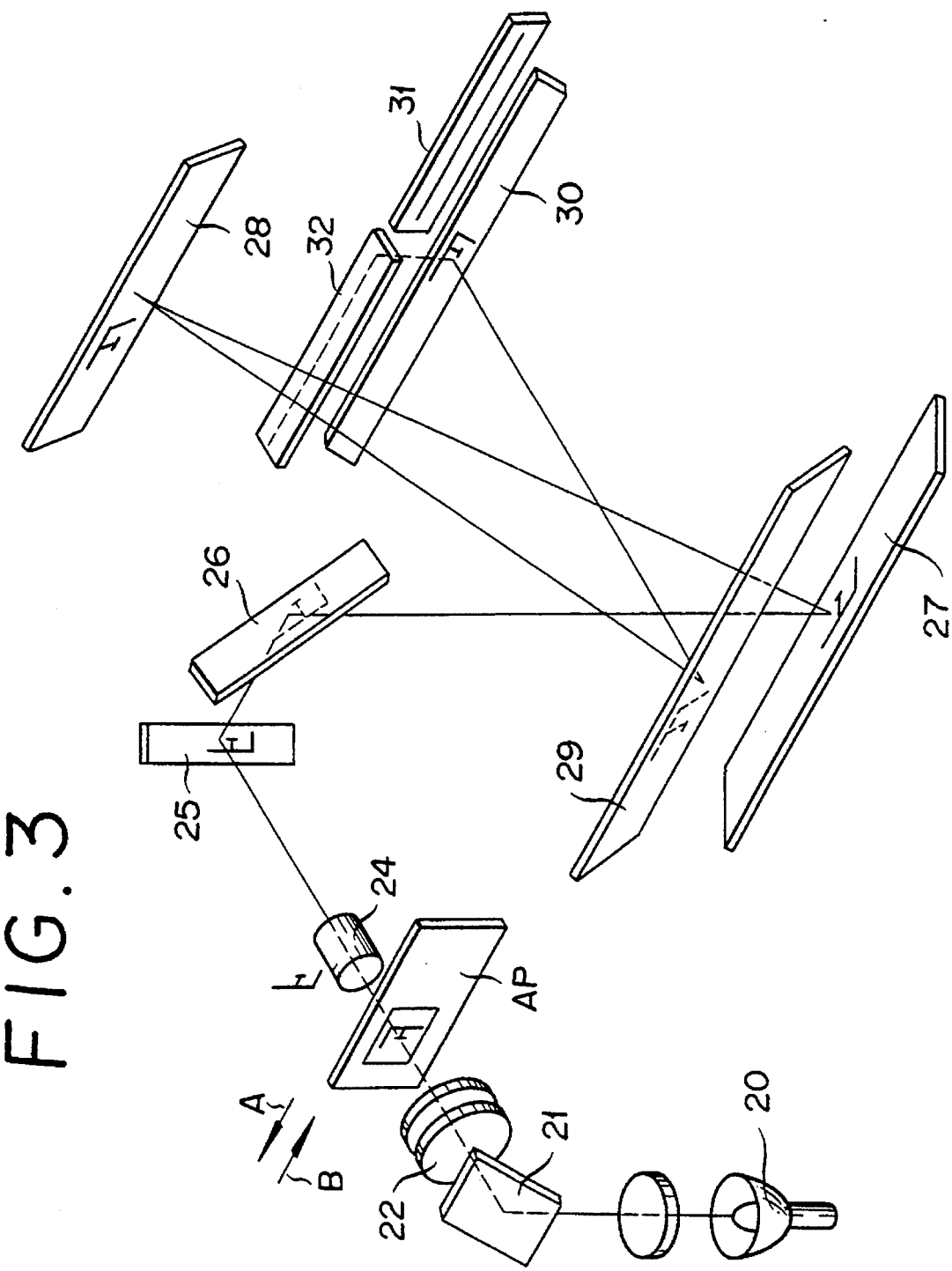
FIG. 3 is a perspective view of of the apparatus of FIG. 2.

As illustrated in FIG. 2 and FIG. 3, the light from a light source 20 is bent by a reflecting mirror 21, then passed through a condenser lens 22, and brought to a film carrier part 23. A recorded image on an aperture card AP is scanned while the aperture card AP is charged on the carrier part 23. The light which has passed through the film on the card AP is passed through a projecting lens 24 to be diverged thereby and then advanced from a first mirror 25 sequentially to a second mirror 26, a third mirror 27, a fourth mirror 28, and a fifth mirror 29. By these mirrors is formed a prescribed light path. To allow change of the lamp 20 as the light source and maintenance of a base plate of a control part, the housing 10 is provided in the front surface thereof with a front lid 14 which is adapted to be freely opened and shut. The opposite terminal parts of the upper surface of the housing 10 are inclined toward the front side. When the open-shut lid 13 is opened, the card AP appears clearly through the lid 13. The operator, therefore, is enabled to remedy a jam or perform maintenance of relevant components of the apparatus through the opening of the lid 13 without experiencing the feeling of inserting his hand into the apparatus.

The projected light which has passed through the fifth mirror 29 reaches a half mirror 30. Of the light impinging on the half mirror 30, the right half portion shown in FIG. 3 is caused to pass through the half mirror 30 and impinge on a first line sensor 31 and the left half portion is reflected by the half mirror 30 and allowed to impinge on a second line sensor 32. The line sensors 31 and 32, therefore, each have a length about a half of the length of the half mirror 30. The line sensors 31 and 32 are each formed of a multiplicity of CCD elements arranged in a linear form. As illustrated in FIG. 2, the first line sensor 31 is positioned so that the surface thereof lies vertically, whereas the second line sensor 32 is positioned so that the surface thereof looks downwardly and lies horizontally. These line sensors 31 and 32 jointly serve as reading means.

FIG. 3 shows the change in posture of an image proportionate to the displacement of the optical axis of the light path, with respect to an assumed case of using the letter "F" recorded on the film of the aperture card AP. The reading of the image on the film of the card AP is carried out while the film is so charged that the rear surface side of the film confronts the front surface of the housing 10 of the apparatus illustrated in FIG. 1.

Figure 4:
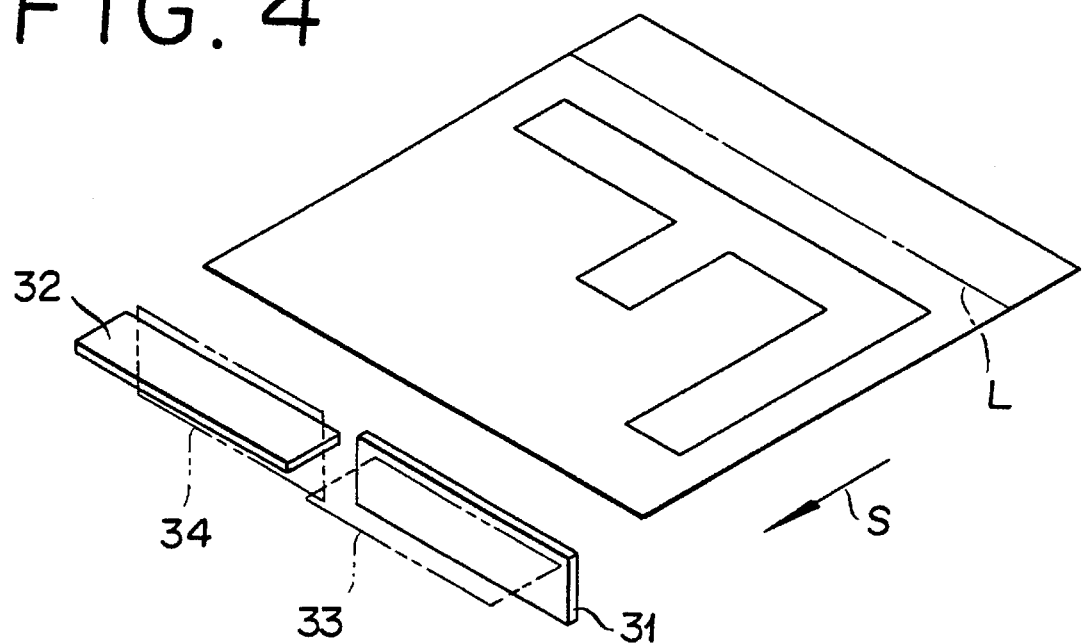
FIG. 4 is a perspective view illustrating the basic concept of an operation for causing one main scanning line to be divided and projected onto two line sensors.

On the half mirror 30, the line L of one image information in the direction of main scanning is wholly projected as illustrated in FIG. 4. On the two line sensors 31 and 32, the portions of the image information corresponding to two equal halves of the line L in the direction of main scanning are simultaneously projected via the half mirror 30 as illustrated in FIG. 4, with the result that the image information will be wholly read out. When the aperture card AP is conveyed by the film carrier 23 in I the longitudinal direction of the card to effect the feeding of this card in the direction of auxiliary scanning, the image information is scanned in the direction of auxiliary scanning indicated by an arrow S in FIG. 4. As a result, the two line sensors 31 and 32 jointly read out the entire image information from the film.

In the illustrated case, the image is reproduced on a recording paper of the A2 size with a resolution of 400 dpi and the line sensors 31 and 32 each have a length of about one half of the width of the recording paper of the A2 size. These sensors, in the illustrated embodiment, each use contact type CCD's. The density of picture elements is such that one dot measures 63 µm. In the case of reduced CCD's, one dot measures 7 µm. In due consideration of the operational efficiency of alignment of sensors, the accuracy of layout of component parts, the effects of such external phenomena as vibration, temperature, humidity, and dust on the performance of the apparatus in actual service, and the depth of an object recorded on the surface of CCD's in the sensors, the illustrated apparatus has been elected to use the contact type CCD's.

Figure 5:
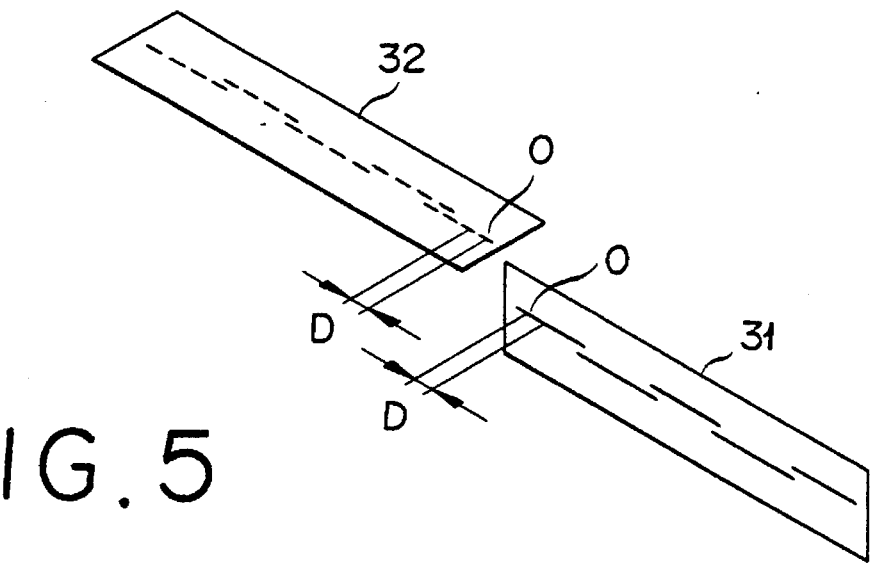
FIG. 5 is a perspective view illustrating the part in which the optical axes impinging on the two line sensors overlap the main scanning line.

As illustrated in FIG. 5, one same image is projected in portions of a size D on the sensors 31 and 32 opposed to each other across the optical axis 0 as the center. In the illustrated case, this size D equals 32 dots of picture elements or 2 mm. The overlapping portions are utilized in adjusting the relative positions of the sensors, adjusting the edges, and controlling the image processing such as variation of an electronic magnification. As the image information to be read out, the information from either of the two sensors is given priority.

Since the two line sensors 31 and 32 are made to effect simultaneous reading of about halved portions of the image information lying on the line L in the direction of main scanning, the signals from these sensors 31 and 32 can be simultaneously processed by separate image processing parts of their own and, therefore, the image processing can be performed quickly. When the two line sensors are slid from each other in the direction of auxiliary scanning in such a manner that the CCD surfaces of the line sensors fall flush with each other and the common portions of the image of a size of D overlap each other to allow reproduction of the image in its continuous form, simultaneous reading of one line cannot be obtained as in the illustrated embodiment and, therefore, necessitates a memory capable of adjusting the timing of transmission of signals to the printer and entails an addition to the cost of production of the apparatus. When the light path is divided into two equal halves by the half mirror 30 to effect simultaneous reading of one line in separate surfaces as illustrated, the image information can be quickly processed and the information can be quickly transmitted to the printer without any addition to the cost of production.

The half mirror 330 and the two line sensors 31 and 32 are integrally fixed to a reading unit or a CCD unit 18 as illustrated in FIG. 2. This reading unit 18 is positioned on the rear surface side of the housing 10. When an exterior lid 15 provided in this region is opened, the reading unit 18 and the fourth mirror 28 disposed above the reading unit 18 are exposed to the exterior.

Since these sensors 31 and 32 and the half mirror 30 are integrated with one and the same reading unit 18, the error of conjugate lengths of the two light paths can be decreased to a minimum. The alignment of optical axes can be attained outside the apparatus by adjusting the fourth mirror 28. Screens 33 and 34 are disposed in close proximity to the line sensors 31 and 32 as illustrated in FIG. 4 so that the alignment of optical axes and the adjustment of focuses may be performed during the process of assembly and adjustment of the apparatus. These screens 33 and 34 are fixed to supporting members 35 and 36 which will be described more specifically herein below in the portions thereof in which the sensors 31 and 32 are not positioned. The screen surfaces of the screens 33 and 34 assume equivalent positions with the surfaces of the line sensors 31 and 32 for receiving light via the half mirror 30.

Figure 6:
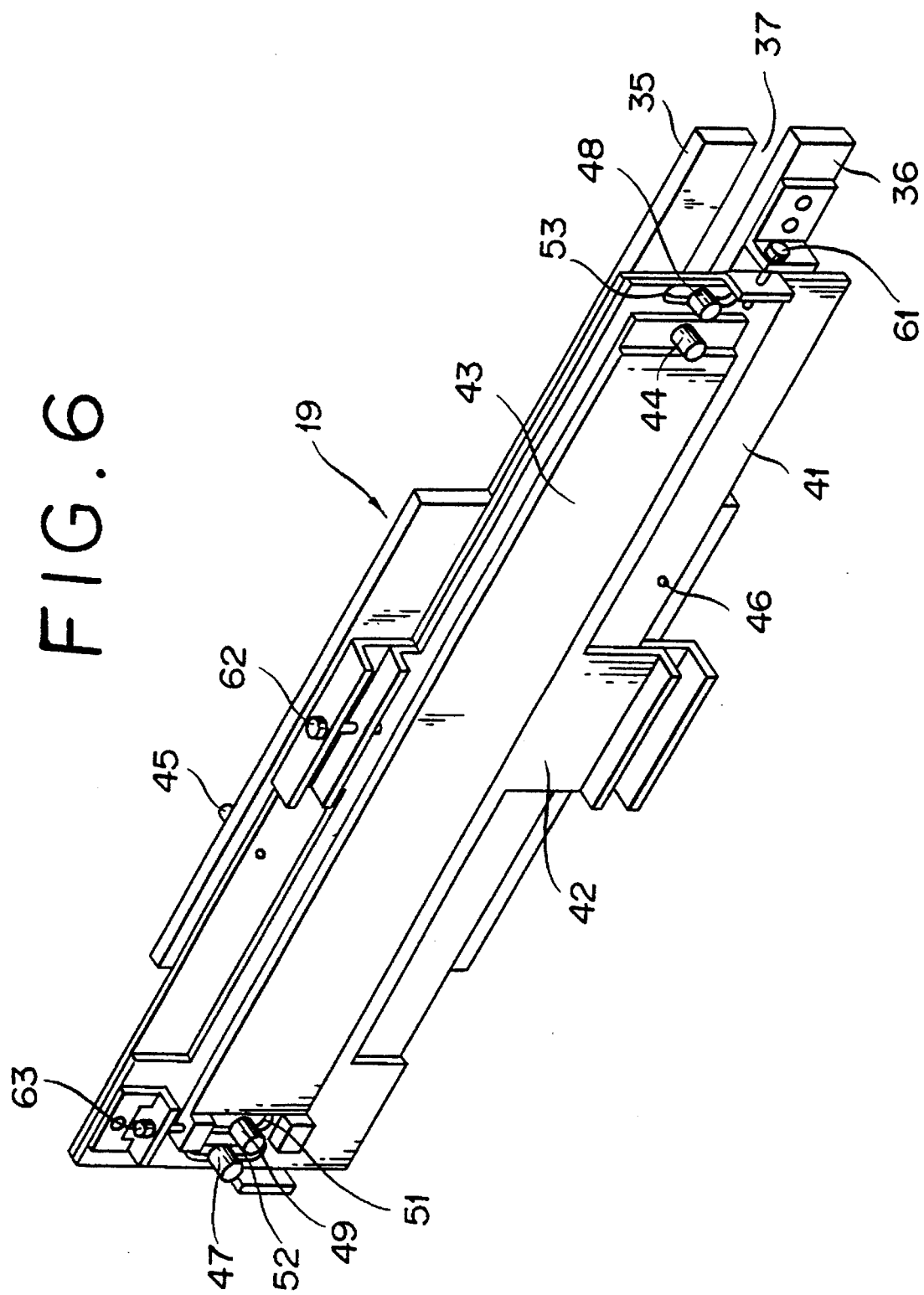
FIG. 6 is a perspective view illustrating the outer surface side of a line sensor unit.
Figure 7:
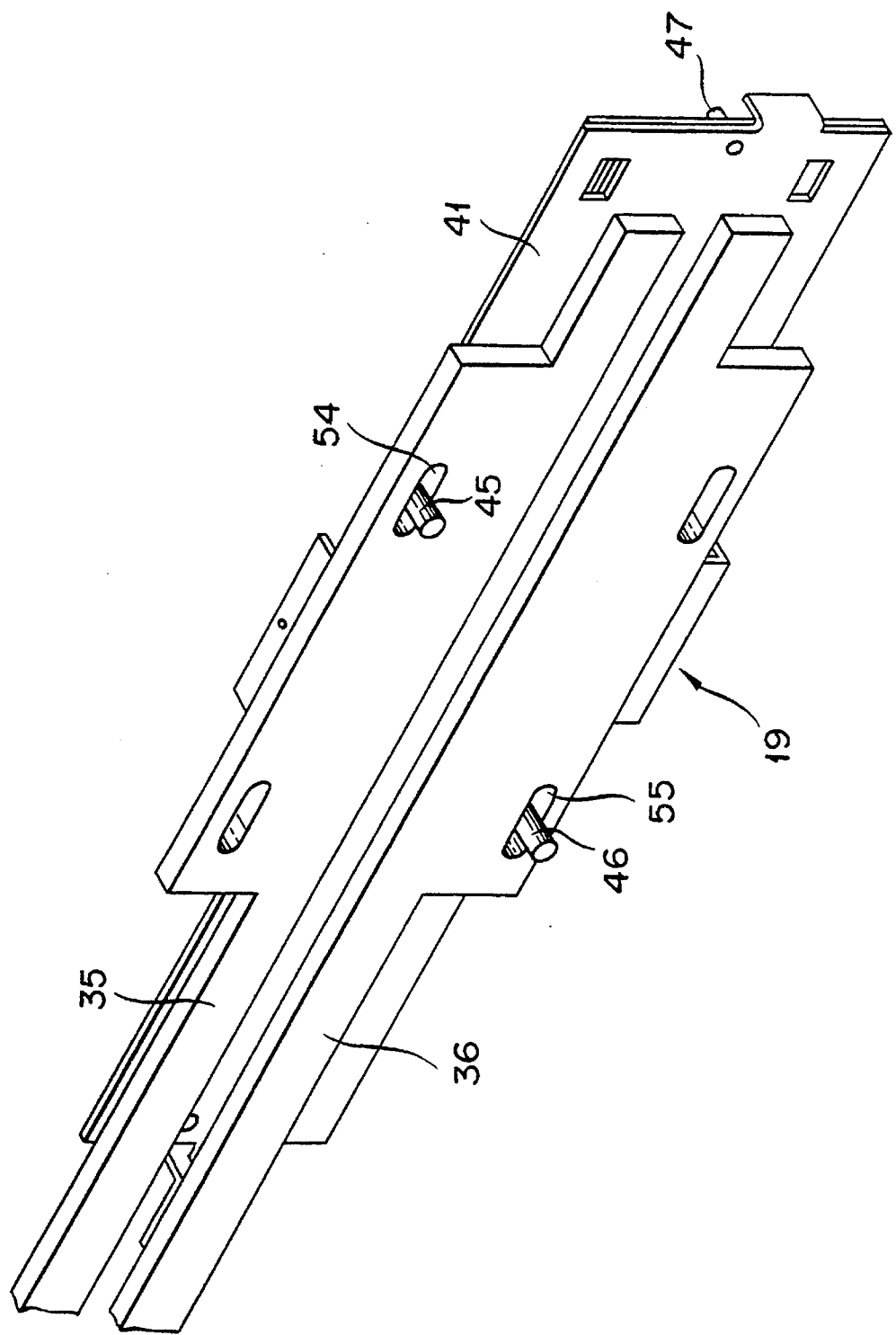
FIG. 7 is a perspective view illustrating the inner surface side of the line sensor unit.
Figure 8:
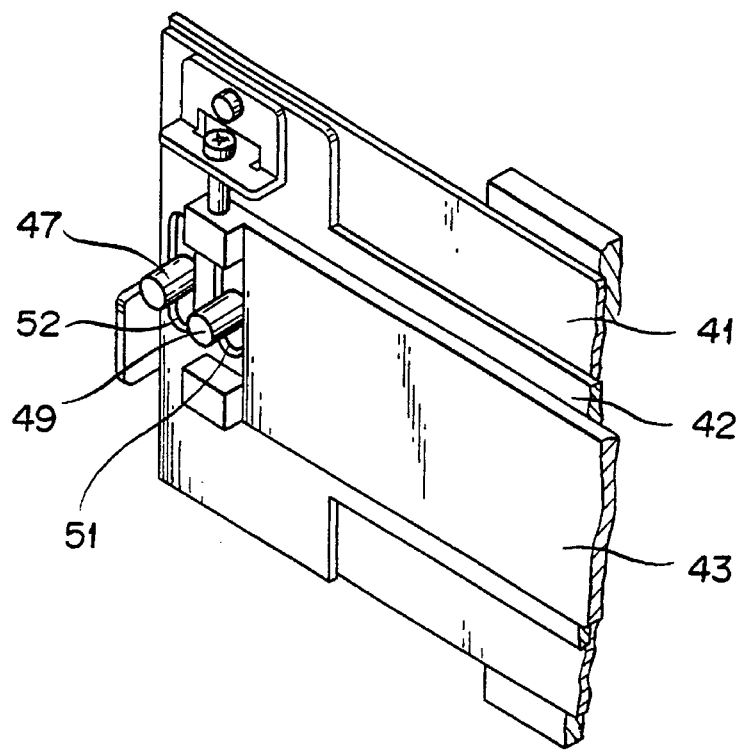
FIG. 8 is a perspective view illustrating the left terminal part of the line sensor unit shown in FIG. 6 in a magnified scale.
Figure 9:
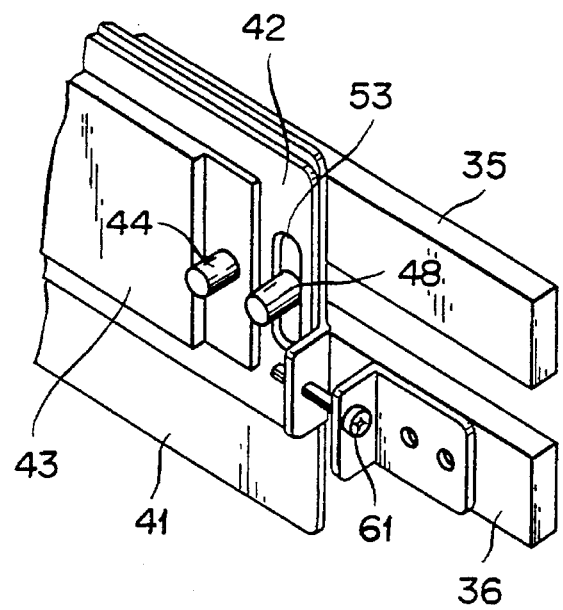
FIG. 9 is a perspective view illustrating the right terminal part of the line sensor unit shown in FIG. 6 in a magnified scale.

A sensor unit 19 provided with the line sensor 31 is constructed as illustrated in FIG. 6 and FIG. 7. FIG. 6 represents the sensor unit 19 posed as set in place and viewed from outside the housing 10, with the rear surface side of the sensor unit 19 on the foreground. FIG. 7 represents the sensor unit 19 as viewed from the inside of the housing 10. The left terminal part of the sensor unit 19 shown in FIG. 6 is illustrated in a magnified scale in FIG. 8 and the right terminal part thereof shown in FIG. 6 is illustrated in a magnified scale in FIG. 9.

Figure 10:
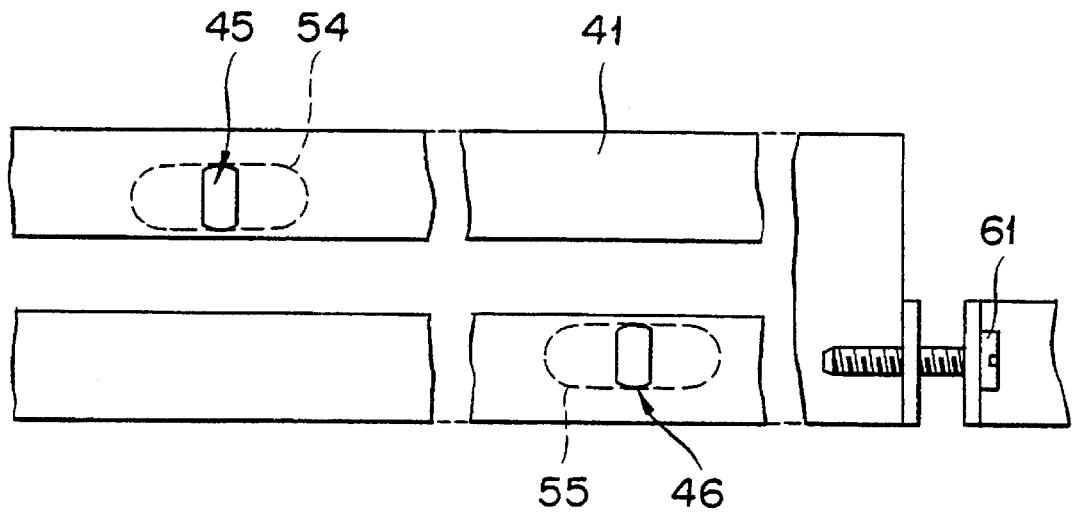
FIG. 10 is a partially omitted front view illustrating a longitudinally moving plate.
Figure 11:
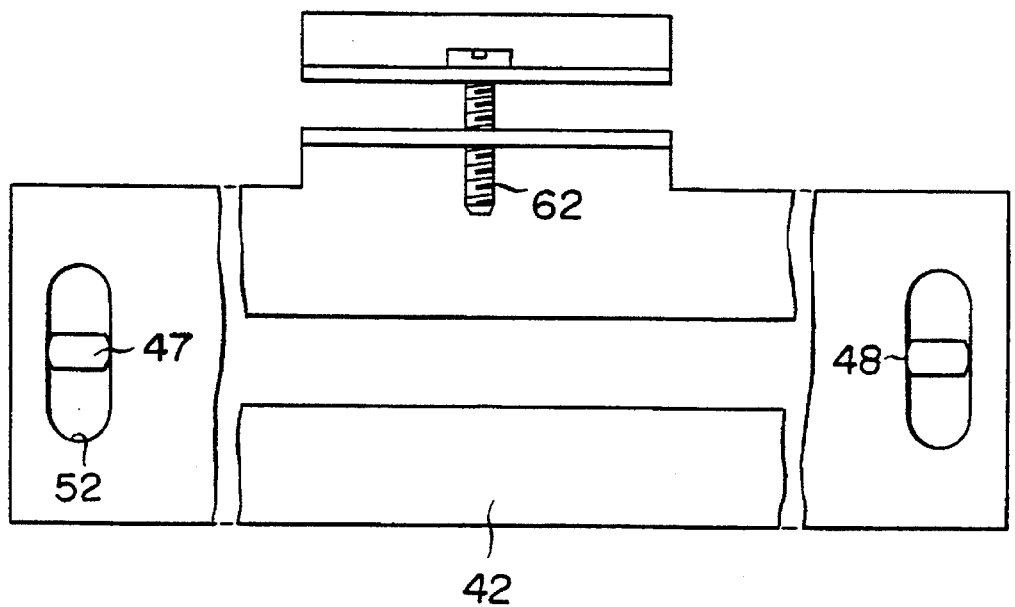
FIG. 11 is a partially omitted front view of a laterally moving plate.

The two supporting members 35 and 36 of the sensor unit 19 are separated from each other by a prescribed interval 37 and fixed to a holder block (not shown) for the sensor unit 19. To the exterior surfaces of the supporting members 35 and 36, a longitudinally moving plate 41 is attached in such a manner as to be freely moved in the lateral direction in the bearings of FIG. 6. To the rear surface of the longitudinally moving plate 41, a laterally moving plate 42 is attached in such a manner as to be freely moved in the vertical direction in the bearings of FIG. 6. Further to the rear surface of the laterally moving plate 42, an angle adjusting plate 43 is attached in such a manner as to be freely rotated around a fastening member 44 as the center. To the angle adjusting plate 43 is attached the base plate of the line sensor 31. Since FIG. 6 shows the rear surfaces of such parts as the angle adjusting plate 43 as described above, the line sensor 31 is depicted as attached to the front surface side of this angle adjusting plate 43. In order that the projected light may impinge on the line sensor 31, slits are formed in the longitudinally moving plate 41 and the laterally moving plate 42 in such a manner as to correspond to the intervals 37 as illustrated in FIG. 10 and FIG. 11. A similar slit may be formed in the angle adjusting plate 43 and the sensor 31 attached to the exterior surface of the angle adjusting plate 43.

The direction of motion of the longitudinally moving plate 41 corresponds to the direction of main scanning and the direction of motion of the laterally moving plate 42 corresponds to the direction of auxiliary scanning. In order that the longitudinally moving plate 41 may be fixed to the supporting members 35 and 36 in such a manner as to keep contact therewith, the moving plate 41 has attached thereto fastening members 45 and 46 which are adapted to impart resilience to the supporting members 35 and 36 and fix them in place. In order that the laterally moving plate 42 may be fixed to the longitudinally moving plate 41 in such a manner as to keep contact therewith, fastening members 47 and 48 adapted to impart resilience to the laterally moving plate 42 and fix it in place are attached to the longitudinally moving plate 41 as aligned to the opposite terminal parts of the laterally moving plate 42. In order that the angle adjusting plate 43 may be similarly fixed to the laterally moving plate 42 in such a manner as to keep contact therewith, a fastening member 49 is attached to the laterally moving plate 42 as positioned on the opposite side of the angle adjusting plate 43 relative to the fastening member 44. The fastening member 49 pierces an oblong hole 51 shaped arcuately about the fastening member 44 which forms the center of rotation of the angle adjusting plate 43 and the two fastening members 47 and 48 respectively pierce oblong holes 52 and 53 formed as laterally extended in the longitudinally moving plate 42. Further, the fastening members 45 and 46 respectively pierce oblong holes 54 and 55 formed as longitudinally extended in the supporting members 35 and 36 as illustrated in FIG. 7.

In order that the longitudinally moving plate 41 may produce an adjusted motion in the longitudinal direction, an adjusting screw 61 is rotatably attached to the supporting member 36 and the threaded part of this adjusting screw 61 is helically joined to the longitudinally moving plate 41. When a screw having a nominal diameter of 3 mm is used as the adjusting screw 61, a 45 degrees rotation of this screw 61 produces a 62.5 μm motion of the longitudinally moving plate 41. This distance, 62.5 μm, equals about one picture element of the CCD element. In order that the laterally moving plate 42 may be moved in the lateral direction, an adjusting screw 62 is rotatably attached to the longitudinally moving plate 41 and the threaded part of this adjusting screw 62 is helically joined to the laterally moving plate 42. In order that the angle adjusting plate 43 may be rotated around the fastening member 44, an adjusting screw 63 is rotatably attached to the laterally moving plate 42 and the threaded part of this adjusting screw 63 is helically joined to the angle adjusting plate 43. A compression coil spring may be attached to the exterior side of each of these adjusting screws 61 to 63.

Figure 13:
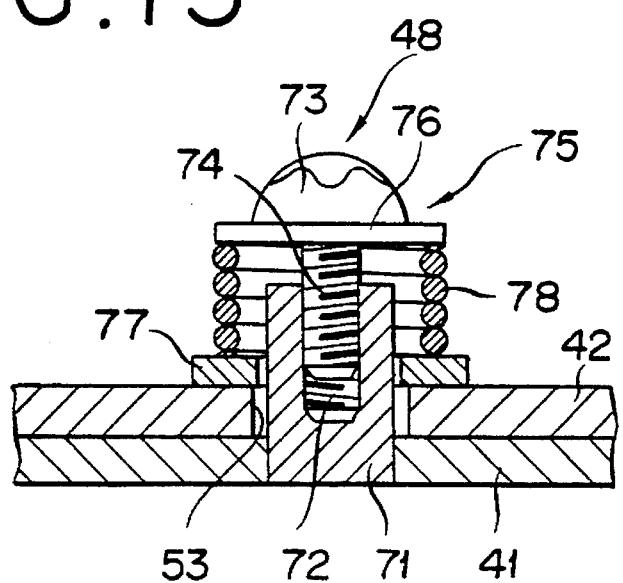
FIG. 13 is a magnified cross section illustrating a tying member.

Of the total of six fastening members 44 to 49 illustrated in FIG. 6, the fastening member 48 is illustrated in detail in FIG. 13.

As illustrated in FIG. 13, the longitudinally moving plate 41 serves as a retaining side member and movably retains the laterally moving plate 42 which serves as a moving side member. A shaft member 71 which pierces the oblong hole 53 formed in the laterally moving plate 42 is projected from the longitudinally moving plate 41. This shaft member 71 has a threaded hole 72 formed in the axial direction in the central part thereof. A screw member 75 provided with a head part 73 and a screw part 74 is helically joined to the shaft member 71 by the threaded hole 72 part thereof. A snap 76 is joined to the screw member 75 and this snap 76 forms part of the head part 73. A washer 77 adapted to contact the exterior surface of the laterally moving plate 42 is set outside the shaft member 71. A compression coil spring 78 is set in place between this washer 77 and the head part 73 of the screw member 75.

Figure 14A:
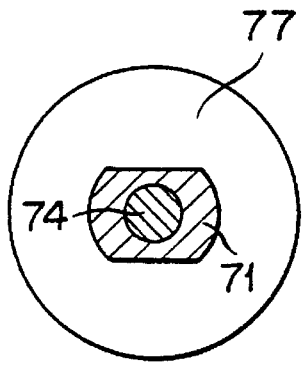
FIG. 14 is a cross section illustrating washer parts.

The cross section of the shaft member 71 has an oval shape consisting of straight parts and arcuate parts as illustrated in FIG. 14A. The insertion hole of the washer 77 has an oval shape conforming to the outer peripheral shape of the shaft member 71. The straight parts formed in the shaft member 71 constitute themselves an engaging part and the washer 77 is kept in engagement with the engating part. When the screw member 75 is set to rotation, therefore, the washer 17 cannot be rotated because the washer 77 is kept fast in place in such a manner as to have the rotation thereof restrained with respect to the shaft member 71 even if a rotational force is transmitted via the spring 78 to the washer 77 in consequence of the rotation of the screw member 75.

Figure 14B:
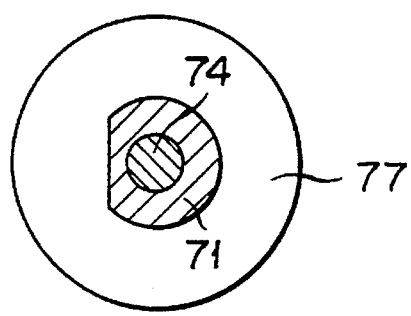
Figure 14C:
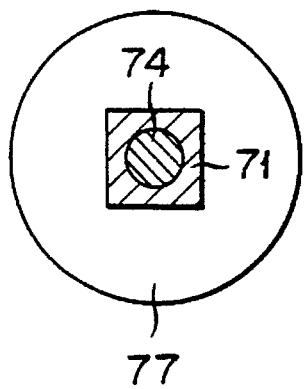
Figure 14D:
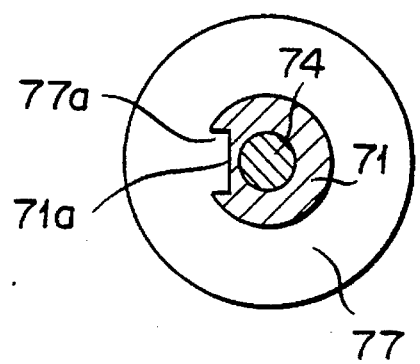

The straight parts formed on the outer peripheral surface of the shaft member 71 constitute themselves the engaging part as described above and the engaging part serves the purpose of restraining the rotation of the washer 77 as described above. This engaging part may be formed by giving the shape of the letter D to the cross section of the shaft member 71 as illustrated in FIG. 14B or by giving a non-circular shape such as a quadrilateral to the cross section as illustrated in FIG. 14C. Otherwise, a groove 71a extended in the axial direction may be formed in part of the shaft member 71 and a projection 77a formed on the washer 77 may be allowed to engage with the groove 71a as illustrated in FIG. 14D. The engaging part of a varying type described above may be formed throughout the entire length in the axial direction of the shaft member 71. Instead of forming the engaging part in the portion intended for insertion in the hole 53, the portion mention above may be given a circular cross section.

When the laterally moving plate 42 is fixed relative to the longitudinally moving plate by the use of the fastening member 48 constructed as described above, the screw member 75 is rotated and consequently tightened onto the shaft member 71. The rotational force generated in this case cannot be transmitted to the laterally moving plate 42 because the washer 77 kept in contact with the laterally moving member 42 is engaged with the shaft member 71 and consequently prevented from rotating. The tightening force of the screw member 75 in the axial direction, owing to the fast contact of the spring 78 to the screw member 75 as illustrated in FIG. 13, is transmitted to the laterally moving plate 42 through the medium of the spring 78 and the washer 77 to accomplish a tie of the laterally moving plate 42 to the longitudinally moving plate 41.

It is suspected that a slight play or gap occurs between the shaft member 71 and the washer 77 at the time that the screw member 75 is set to rotation. Since the component volutes of the spring 78 are not in a state of fast mutual contact at the time that the screw member 75 is set to rotation, a slip occurs easily between the washer 77 and the laterally moving plate 42 and the laterally moving plate 42 cannot produce a deviation of position even when the rotation of the screw member 75 is transmitted to the washer 77 through the medium of the spring 78. After the play has ceased to exist, the rotational force produced by the rotation of the screw member 75 cannot be transmitted to the laterally moving plate 42 because the washer 77 is prevented from rotating by the shaft member 71. When the line sensor 31 is subjected to positional adjustment after the image reading apparatus has been assembled, therefore, the rotation of the screw member 71 does not induce the laterally moving plate 42 to produce any sympathetic rotation and this moving plate 42 is tied at the prescribed position. These advantages of the fastening member of this invention become all the more prominent by comparing the embodiment described above with a comparative fastening member illustrated in FIG. 18.

Figure 18:
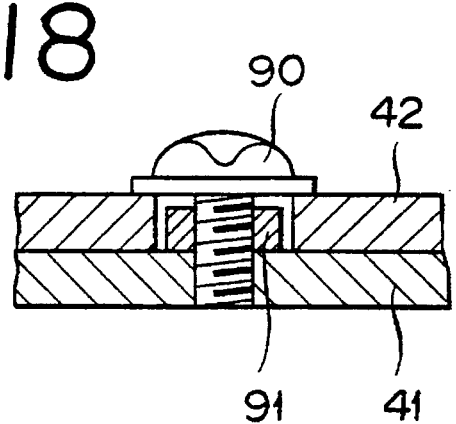
FIG. 18 is a cross section illustrating a comparative example of the tying member.

When a screw member 90 is used for the purpose of fastening the laterally moving plate 42 to the longitudinally moving plate 41 and is helically joined to a shaft member 91 fixed to the laterally moving plate 41 to fix the laterally moving plate 42 directly with the head part of the screw member 90 as illustrated in FIG. 18, the laterally moving plate 42 is suffered to produce a deviated motion because the rotation of the head part is transmitted to the laterally moving plate 42.

Figure 15:
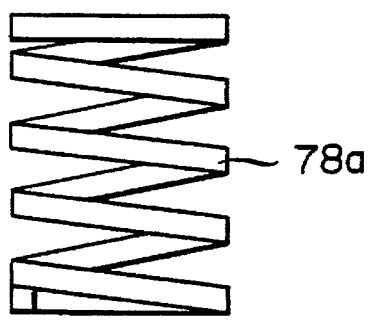
FIG. 15 is a front view illustrating a concrete example of a coil spring.

Instead of the coil spring 78 made of a strand of a circular cross section as illustrated in FIG. 13, an angular spring 78a made of a strand of a rectangular cross section as illustrated in FIG. 15 may be used. When this angular spring 78a is used, the contact surface produced by this coil spring after completion of the fastening has greater fastness than that produced by the coil spring 78 illustrated in FIG. 13.

Figure 16:
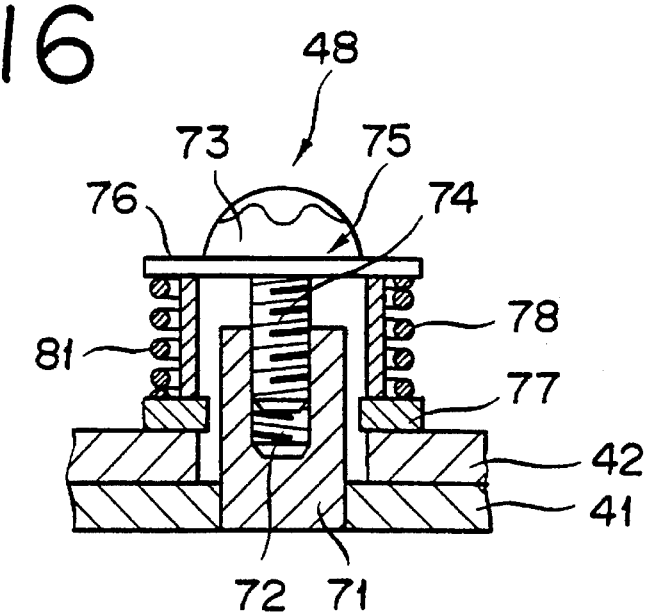
FIG. 16 is a cross section illustrating another concrete example of the tying member.
Figure 17:
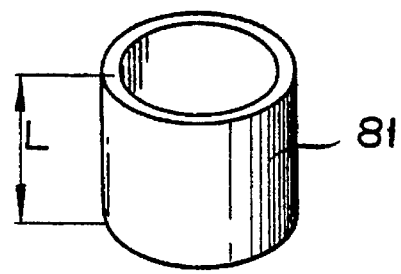
FIG. 17 is a perspective view illustrating a collar shown in FIG. 16.

FIG. 16 and FIG. 17 illustrate another concrete example of the fastening member 48. In this case, the coil spring 78 is adapted to have a cylindrical collar 81 incorporated on the inside thereof so that the tying force of the screw member 75 is transmitted to the washer 77 and the laterally moving plate 42 through the medium of the collar 81 in addition to the spring 78. Let L stand for the length of this collar 81, and the magnitude of this L is shorter than the free length of the coil spring 78. After the fastening of the screw member 75 is completed, the component volutes of the spring 78 are not brought into fast mutual contact and the fastening force of the screw member 75 is transmitted to the laterally moving plate 42 through the medium of the collar 81 and the washer 77.

Figure 12:
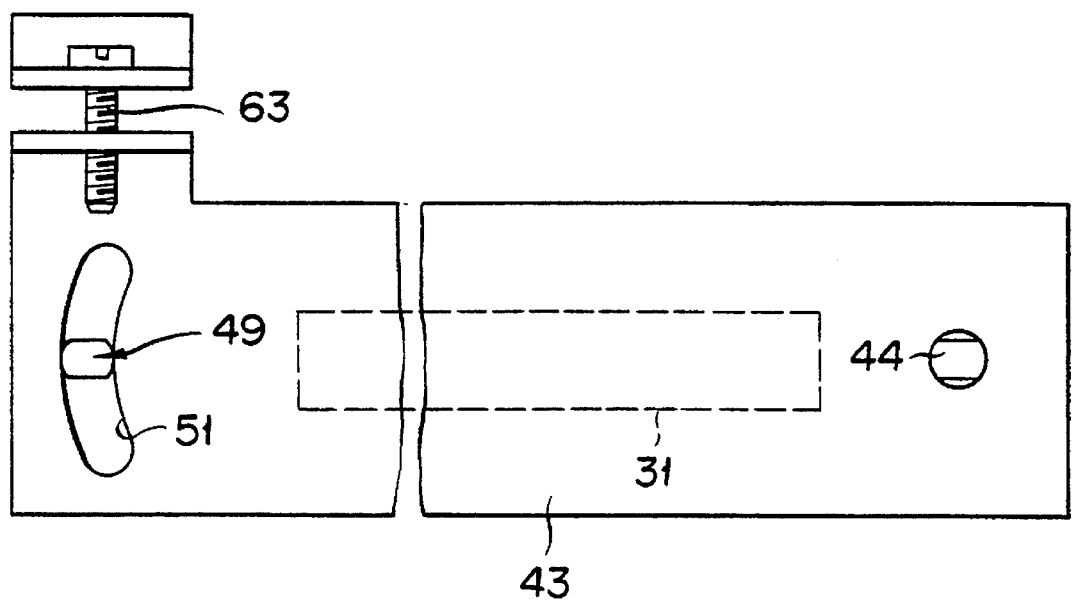
FIG. 12 is a partially omitted front view illustrating an angle adjusting panel.

FIG. 13 illustrates the fastening member 48 in detail. The other fastening members 44 to 47 and 49 have substantially the same construction as this fastening member 48. The fastening members 44 and 49 are intended to retain movably and, at the same time, tie the angle adjusting plate 43 as a moving side member relative to the laterally moving plate 42 as a retaining side member. The shaft member of the fastening member 44 pierces a circular hole formed in the angle adjusting plate 43 and the fastening member 49 pierces an oblong hole of an arcuate shape. Similarly, the fastening members 45 and 46 are intended to retain movably and, at the same time, tie the longitudinally moving plate 42 as a moving side member relative to the supporting members 35 and 36 as retaining side members. FIGS. 10 to 12 illustrate only the shaft members of the fastening members 44 to 49. The illustrated members have an oval shape similarly to the shaft member illustrated in FIG. 14A.

Figure 19:
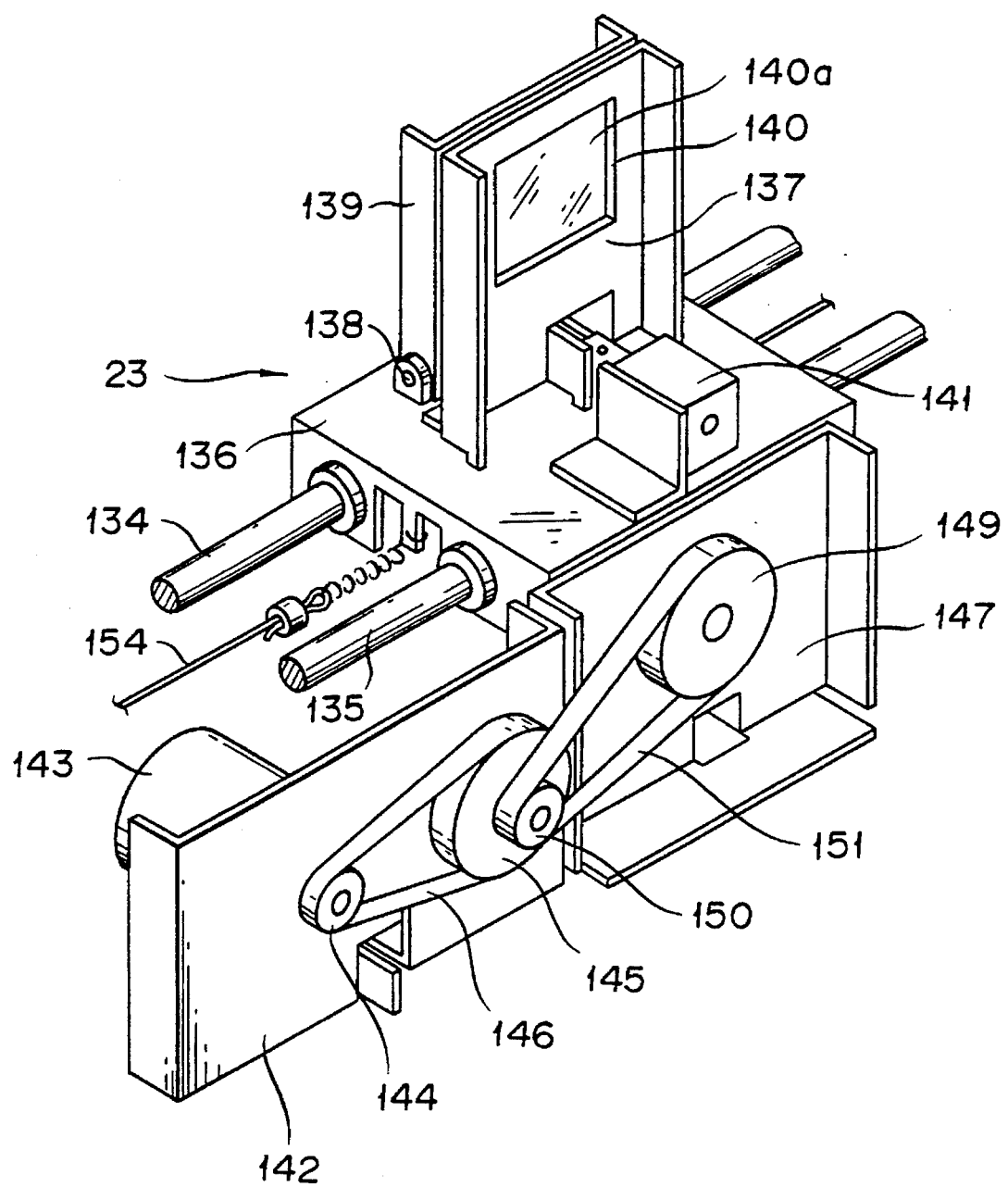
FIG. 19 is a perspective view illustrating a film carrier part shown in FIG. 2.

FIG. 19 illustrates in detail the film carrier part 23 shown in FIG. 2. To two guide rods 134 and 135 fixed parallelly to each other inside the housing 10, a scanning base 136 is attached reciprocally movably along these rods. A stationary plate 137 is attached to this scanning base 136. The aperture card AP is retained as nipped between the stationary plate 137 and a rotary plate 139 adapted to be rotated around a supporting shaft 138 as the center. Window holes 140 for passage of the projected light are formed one each in the two plates 137 and 139. A glass plate 140a is set in place in each window hole 140. A spring (not shown) exerts resilience in the direction of the stationary plate 137 on the rotary plate 139. When the aperture card AP is inserted between the two plates 137 and 139, a solenoid 141 provided on the scanning base 136 drives the rotary plate 139.

The mechanism for moving the scanning base to effect scanning of the recorded image in the direction S of auxiliary scanning indicated in FIG. 4 in response to the motion of the card AP nipped between the stationary plate 137 and the rotary plate 139 in the longitudinal direction will be described below with reference to FIG. 19 and FIG. 20.

A motor 143 is attached to a bracket 142 which is fixed inside the housing 10 and a timing belt 146 is passed round a pulley 144 fixed to the main shaft of the motor 143 and an idle pulley 145 rotatably attached to the bracket 142. A drum 148 is rotataly attached to a braket 147 adjoined fast to the bracket 142. A timing belt 151 is passed round a pulley 149 integrated with the drum 148 and a pulley integrated with the idle pulle 145. The opposite terminals of a wire 154 wound round the drum 148 and, at the same time, passed round pulleys 152 and 153 are fixed to the scanning base 136 as illustrated in FIG. 20. The driving of the motor 143, therefore, moves the scanning base 136 and imparts a scanning motion to the aperture card AP.

Figure 20:
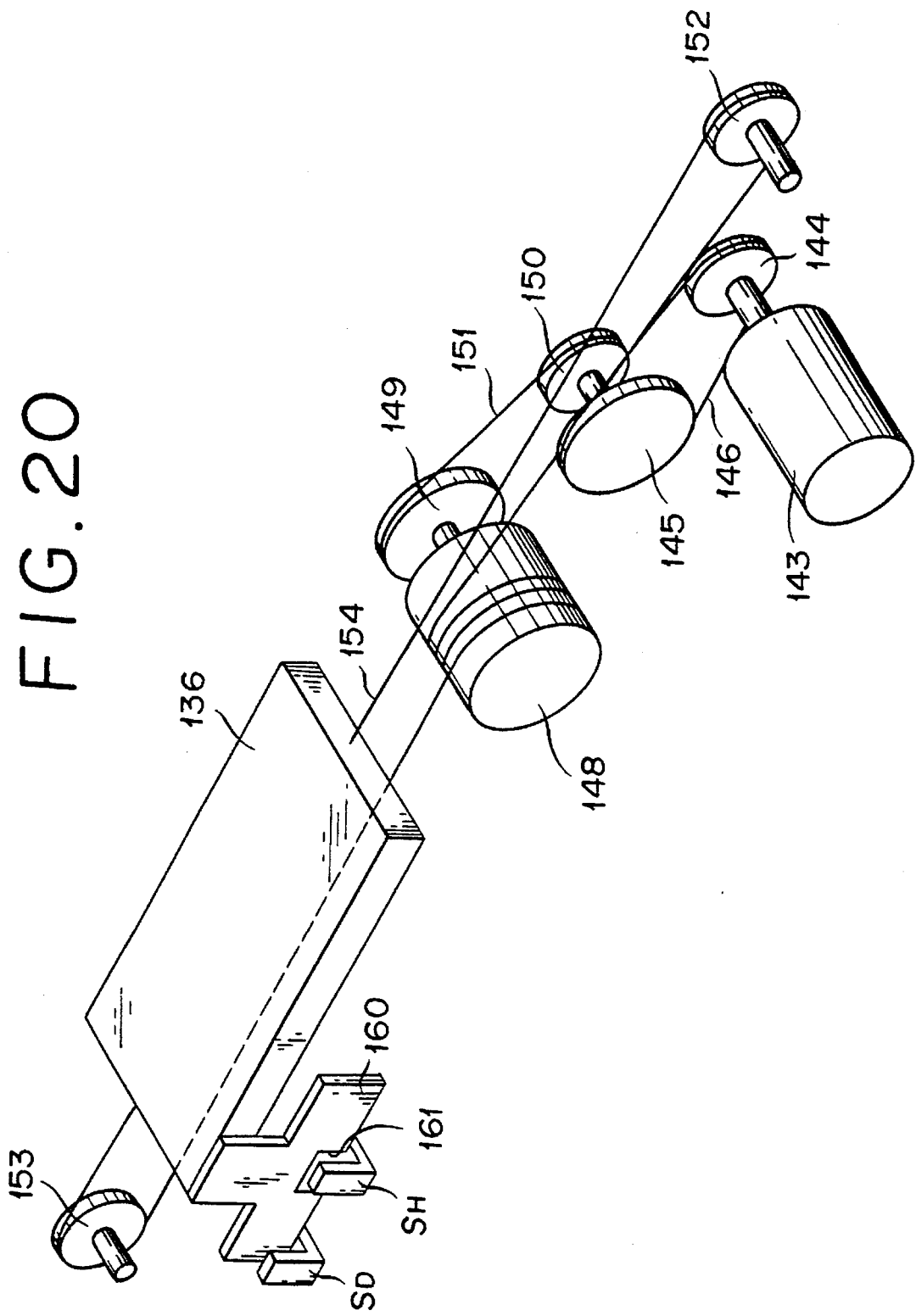
FIG. 20 is a perspective view illustrating a mechanism for driving a scanning base in the film carrier part of FIG. 19.

A controlling plate 160 is fixed to the scanning base 136 as illustrated in FIG. 20. A notched part 161 for setting the home position of the scanning base 136 is formed in the controlling plate 160. A home position sensor SH for discerning whether or not the notched part 161 is set at the prescribed position and consequently discerning whether or not the scanning base 136 is set at the home position and a direction sensor SD for discerning whether or not the controlling plate 160 deviates in either of the lateral directions from the home position are fixed within the housing 10. These two sensors SH and SD are each provided with a light emitting element and a light receiving element and, therefore, are enabled to produce an ON and OFF signal, depending on whether the light from the light emitting element is intercepted before reaching the light receiving element or it is allowed to reach the light receiving element. The positional relation between these two sensors SH and SD on the one part and the controlling plate 160 on the other part is illustrated on a magnified scale in FIG. 21.

Figures 22A, 22B, 22C:
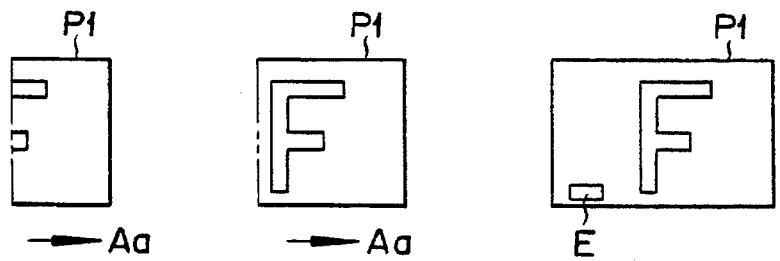
FIG. 22 is a plan view illustrating the direction of output of an image.

FIG. 22 and FIG. 23 illustrate the direction of output of an image when the image recorded on the film of the aperture card AP is read out by the image reading apparatus described above and then printed on a recording paper by a printer. The recording part for recording necessary items such as a date is disposed at a position which corresponds to the left side of the discharge part when the discharge part is viewed from the downstream side of the direction of discharge of the recording paper. FIG. 22 illustrates a recording paper P1 on which an image read in by the line sensors 31 and 32 with the aperture card AP moved in the direction of auxiliary scanning indicated by an arrow A in FIG. 3 is reproduced sequentially in the order in which the image was read in. On the recording paper P1, the image is produced by the printer in the direction indicated by an arrow Aa in the order of FIG. 22A and FIG. 22B and, in the meanwhile, the necessary items E including the date are printed in conjunction with the image in the final part of a print as illustrated in FIG. 22C. On the recording paper P1, therefore, the necessary items E are formed in the lefthand lower corner as illustrated.

Figures 23A, 23B, 23C:
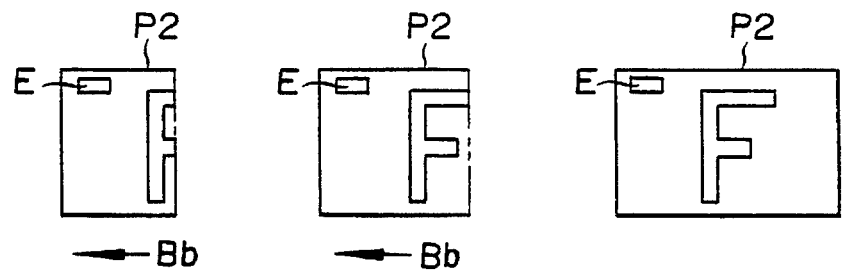
FIG. 23 is a plan view illustrating the direction of output of an image opposite to the direction of FIG. 22.

In contrast to FIG. 22, FIG. 23 illustrates a recording paper P2 on which an image read in during the motion of the aperture card AP in the direction of auxiliary scanning indicated by an arrow B in FIG. 3 is reproduced sequentially in the order in which the image was read in. On this recording paper P2, the image is produced by the printer in the direction indicated by an arrow Bb in the order of FIG. 23A and FIG. 23B and, in the meanwhile, the necessary items E are printed in conjunction with the image in the first part of a print as illustrated in FIG. 23C. On this recording paper P2, therefore, the necessary items E are formed in the lefthand upper corner as illustrated. This formation of the necessary items E is accomplished by writing means which is composed of light emitting diodes incorporated in the printer. In the directions of relative motion of the image on the film and the line sensor, the direction indicated by the arrow B shown in FIG. 3 constitutes iteslf the second direction of motion when the direction indicated by the arrow A is taken as the first direction of motion. Incidentally, the position for recroding the necessary items E can be changed to the righthand lower corner or the righthand upper corner of the recording paper by altering the timing for recording the necessary items E from that involved in the case mentioned above.

Except for the case of forming the necessary items on the recording paper as described above, when the recording paper of a large size on which the printing has been made is forwarded to a paper folding device and automatically folded thereby, the direction of output of print is selected depending on the procedure of folding carried out by the paper folding device.

Figure 24:
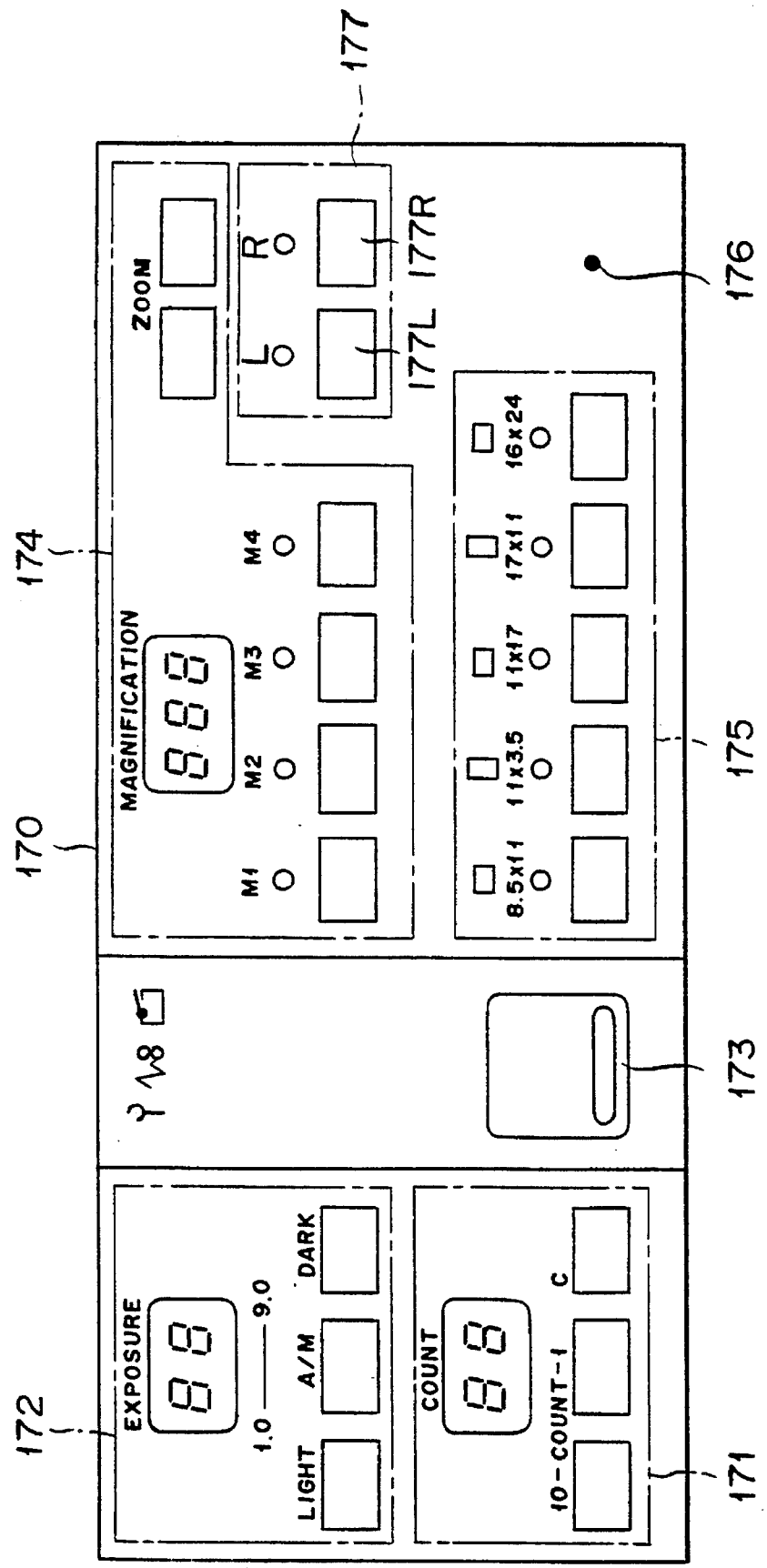
FIG. 24 is a plan view illustrating an operating panel.

FIG. 24 illustrates an operating panel 170 which is provided on the open-shut lid 13. This operating panel 170 is provided with a sheet number setting part 171 for setting the number of recording papers to be printed, a density adjusting part 172 for adjusting the density of an image to be reproduced on the recording paper, a read start button 173 for setting the scanning base 136 to motion and starting the reading of an image recorded on a film, an output size setting part 174 for setting the size of the recording paper on which the image is to be reproduced, a magnification setting part 175 for setting the magnifications of the image recorded on the film, and a function key 176. The operating panel 170 is further provided with a read direction setting part 177 as means of selection. By selecting either of the two switches 177L and 177R provided on this setting part 177, either of the direction shown in FIG. 22 and the direction shown in FIG. 23 is set as the direction of output.

Figure 25:
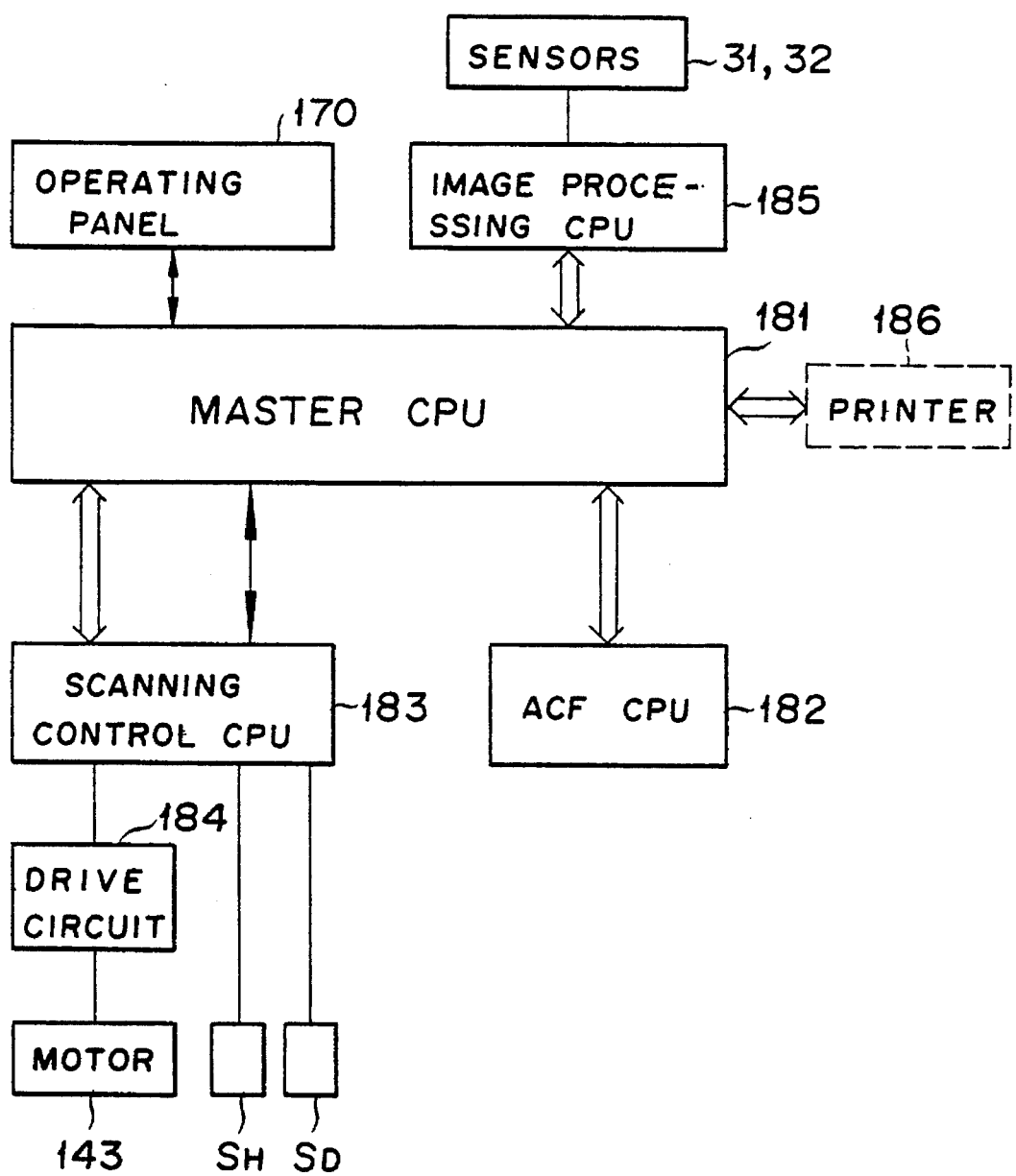
FIG. 25 is a block diagram showing a control circuit for an image reading apparatus.

FIG. 25 is a block diagram illustrating a control circuit for the image reading apparatus. This control circuit incorporates therein a total of four microprocessors, i.e. a master CPU 181 for controlling the operating panel 170, an ACF CPU 182 for controlling the operation of a conveying device for the aperture card AP, a scanning control CPU 183 for controlling the scanning operation, and an image processing CPU 185 for processing image signals read out by the sensors 31 and 32 mentioned above. These microprocessors mutually communicate, exchange data, and check stata. To the scanning control CPU 183 are connected a ROM having programs written therein, a RAM having data stored temporarily therein, and input-output port I/O. To the input-output port are transmitted the signals of the home sensor SH and the direction sensor SD and the signals concerning the input and output of communications and the timing. Further, a drive circuit 184 of the step motor 143 for scanning is connected to the input-output port. The image information which has been read out is delivered in the order of reading by a printer 186 and reproduced on the recording paper.

Now, the operation of the image reading apparatus will be described below on the basis of flow charts illustrated in FIGS. 26 to 31.

Figure 26:
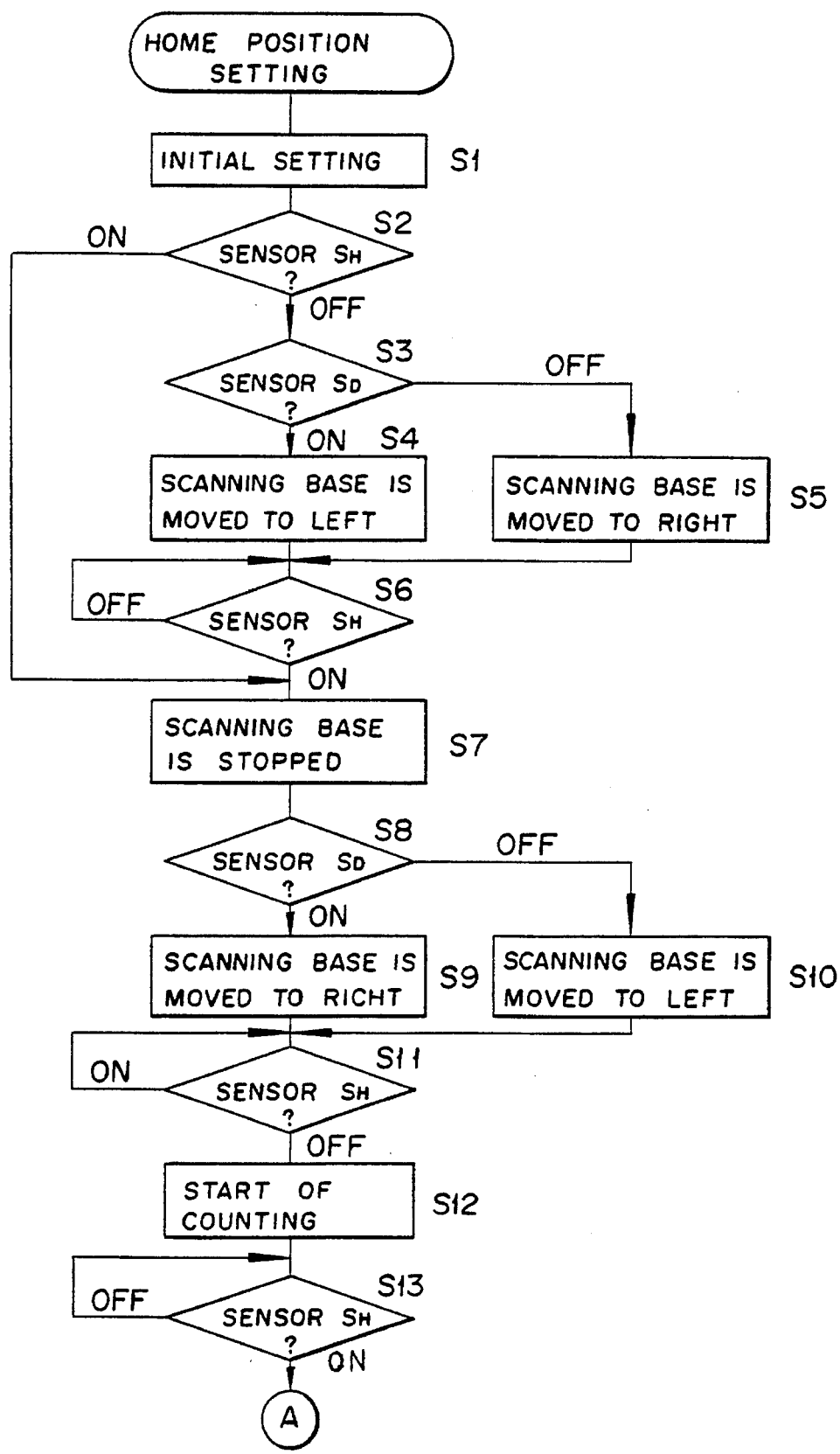
FIG. 26 is a flow chart showing a procedure for setting a home position.
Figure 27:
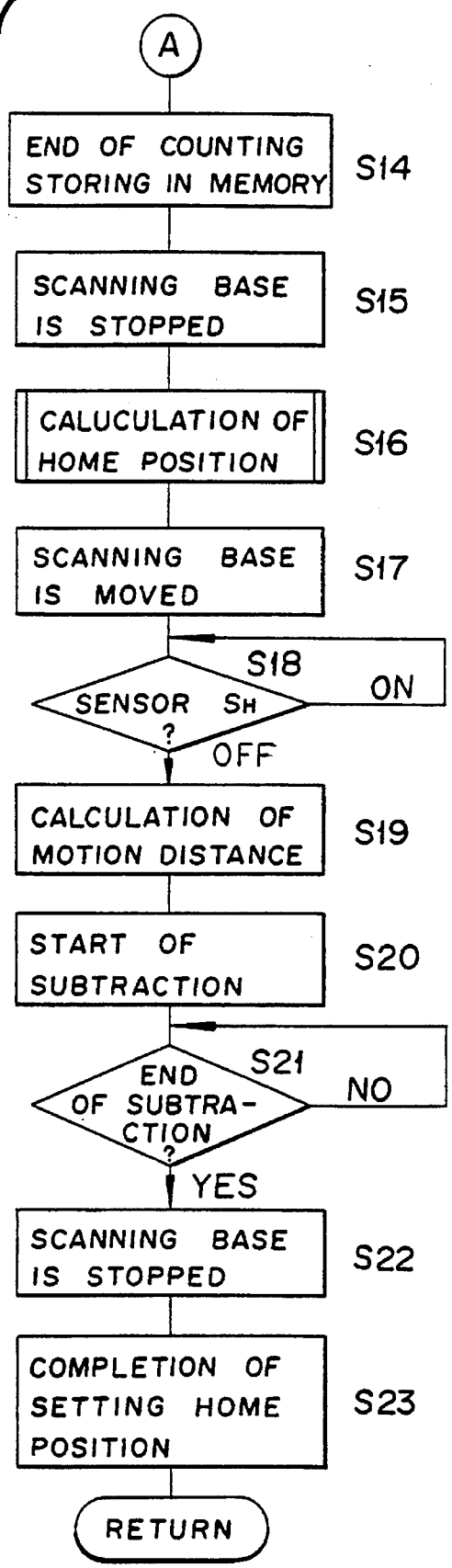
FIG. 27 is a flow chart showing another procedure for setting a home position.
Figure 28:
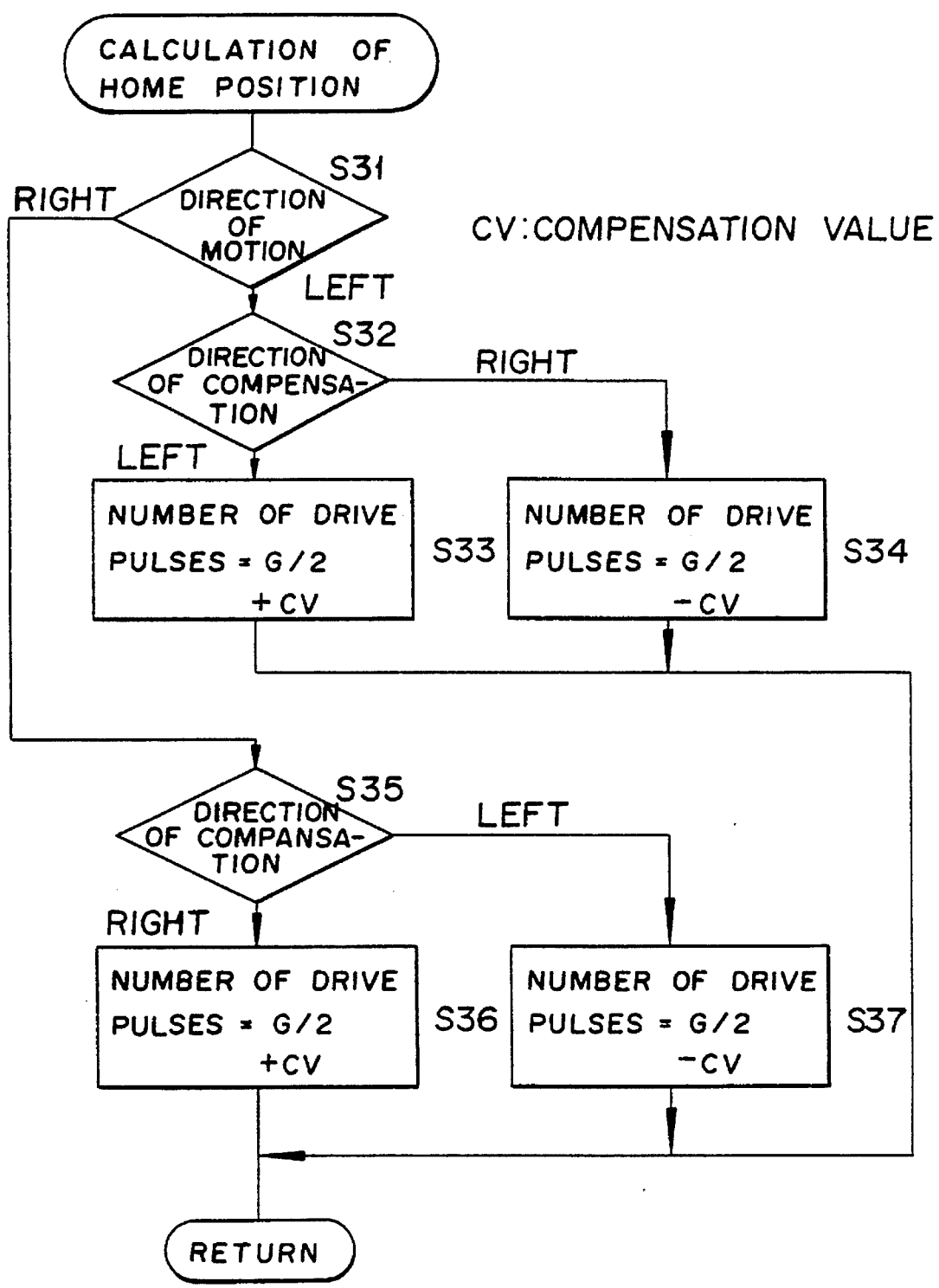
FIG. 28 is a flow chart showing a sub-routine for the step for calculation of the home position in FIG. 27.

FIGS. 26 to 28 are diagrams illustrating a routine for initial scanner setting required for fixing the scanning base 136 at the home position. When the power source is turned on, the initial setting of CPU is effected at Step S1. As a result, the RAM is cleared, a serial communication is set, and a boat is set, and the master CPU 181 is informed of the start of an initializing operation. The contents forwarded by the serial communication are those stored in the master CPU 181, including initial values such as of magnifications and output side and the values of compensation set by the function key 176.

Figure 32A:
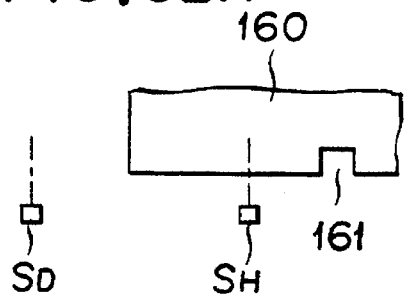
FIG. 32 is a schematic explanatory diagram showing the positional relation between the control plate and the sensor.
Figure 32B:
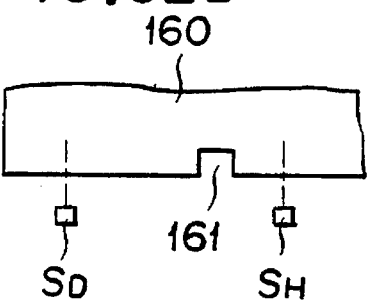
Figure 33A:
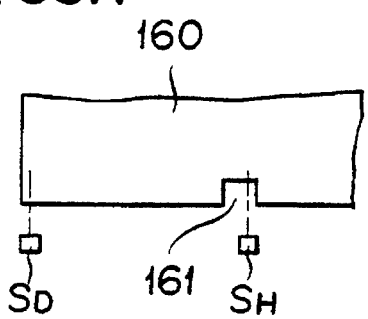
FIG. 33 is a schematic explanatory diagram showing the positional relation between the control plate and the sensor.
Figure 34A:
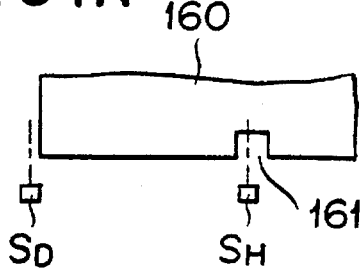
FIG. 34 is a schematic explanatory diagram showing the positional relation between the control plate and the sensor.

The sensors SH and SD, in the following description, are assumed to emit an "ON" signal when the controlling plate 160 intercepts the light traveling from the light emitting element to the light receiving element and an "OFF" signal when the light receiving element receives this light. First, at Step S2, the ON-OFF status of the home sensor SH is discriminated. The sensor SH is discerned to have emitted an "OFF" signal at Step S2 when the position of the notch 161 in the controlling plate 160 is separated from the position of the home sensor SH as illustrated in FIG. 32A and FIG. 32B. In this case, the controlling plate 160 deviates to the right from the home sensor SH as illustrated in FIG. 32A or to the left as illustrated in FIG. 32B. Even when the home sensor SH is positioned inside the notch 161, the deviation occurs to the left as illustrated in FIG. 33A or to the right as illustrated in FIG. 34A. In either of these two cases, the sensor SH is discerned to be in the "OFF" status at Step S2.

Figure 33C:
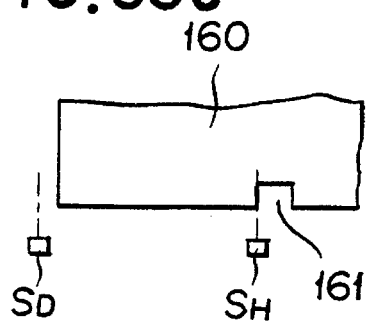
Figure 33B:
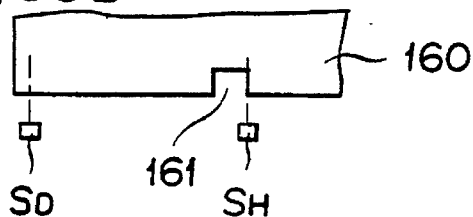
Figure 34C:
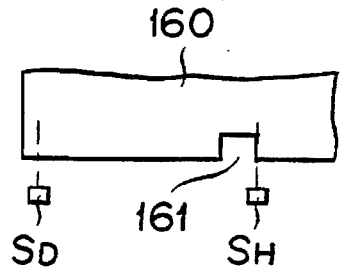
Figure 34B:
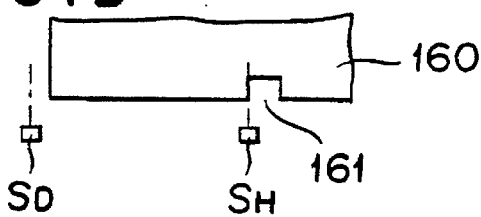

When the sensor SH is discerned to be in the "OFF" status at Step S2, the ON-OFF status of the direction sensor SD is discriminated at Step S3. The sensor SD is in the "ON" status when the home sensor SH is positioned within the notch 161 as illustrated in FIG. 33A and the controlling plate 160 deviates to the left from the center of the notch 161. In this case, the scanning base 136 is driven toward the left at Step S4. The direction sensor SD is discerned to be in the "OFF" status at Step S3 when the controlling plate 160 deviates to the right. In this case, the controlling plate 160 is moved to the right at Step S5. By the motions of the scanning base 136 at these Steps S4, and S5, the edge of the notch 161 reaches the position of the home sensor SH and this sensor SH produces an "ON" signal at Step S6. When the home sensor SH assumes an "ON" status, the scanning base 136 is stopped at Step S7. FIG. 33B depicts the state in which the scanning base 136 is brought to a stop from the state of FIG. 33A and FIG. 34B depicts the state in which the scanning base 136 is brought to a stop from the state of FIG. 34A.

Then, at Step S8, the ON-OFF status of the direction sensor SD is discriminated. To be specific, when the controlling plate 160 assumes the position shown in FIG. 33B, the direction sensor SH is disemed to be in the "ON" status at Step S8 and the scanning base 136 is driven to the right or the direction opposite to the previous direction. Conversely, when the controlling plate assumes the position shown in FIG. 34B, the direction sensor SD is discerned to be in the "OFF" status at Step S8 and the scanning base 136 is driven to the left at Step S10. Even when the controlling plate 160 assumes the positions shown in FIG. 32A and FIG. 32B, namely when the home sensor SH is discerned to be in the "ON" status at Step S2, the scanning base 136 is moved in the prescribed direction by the operations at Steps S9 and S10.

The home sensor SH is discerned to be in the "ON" status at Step S6 when the light from the light emitting element of this sensor has not reached the light receiving element. When the scanning base 136 in the ensuant state is driven by the operation at Steps S9 and S10, the light is made to reach the light receiving element of the home sensor SH. In short, this sensor SH produces an OFF signal. When the production of this OFF signal is discerned at Step S11, Step S12 is executed to reset the counter and, at the same time, start the counting of the number of drive pulses of the pulse motor 141 for scanning motion. When the assumption of the "ON" status by the home sensor SH, namely the interception of the light from the sensor SH by the controlling plate 160, is discerned at Step S13, the counting by the counter is terminated and, at the same time, the count taken thence is stored in the memory (step S14)and the motion of the scanning base 136 is stopped at Step S15. The state in which the controlling plate 160 is brought to a stop at Step S15 is illustrated in FIG. 33C and FIG. 34C.

Figure 21:
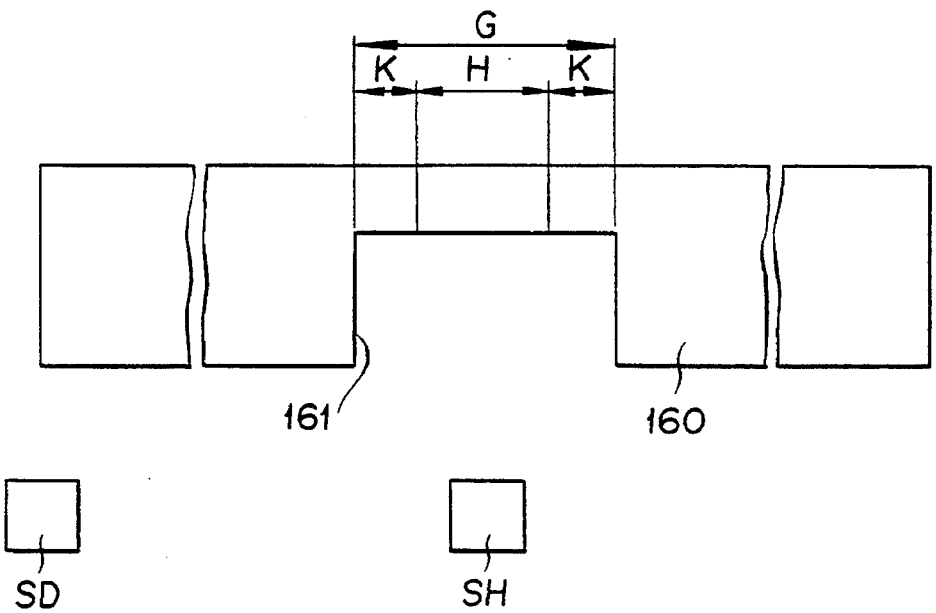
FIG. 21 is a partially omitted magnified front view illustrating a home sensor, a direction sensor, and a control plate shown in FIG. 20.

Through the steps described above, the size G (number of pulses) of the notch 161 formed in the controlling plate 160 is determined and the value thus found is memorized so as to be used afterward for fixing the home position of the controlling plate 160. This calculation of the width G of the notch 161 is necessary because the production of the controlling plate 160 possibly allows for an error of fabrication. When the edge size G of the notch 161 in the controlling plate 160 is 4 mm, the slow-down distance K is 1 mm, and the distance H for correction of positioning is H as illustrated in FIG. 21, the slow-down distance K equals 50 pulses and the distance H for correction of the positioning equals 100 pulses on the condition that the scanning base 136 is moved at a rate of 0.02 mm for each of the pulses fed to the pulse motor 143.

Then, for the purpose of moving the controlling plate 160 so that the prescribed position obtained by using the central position of the notch 161 in the controlling plate 160 as the standard and adding a compensating value to the standard will constitute itself the home position, the amount of motion which the scanning base 136 is required to produce for the sake of the motion mentioned above is calculated at Step S16. This amount of motion is set by using the distance G between the opposite edges of the notch 161 being measured and the value of compensation for the home position set in advance and further taking into consideration the distance from the edge required for the controlling plate 160 to assume the home position mentioned above as well as the direction of the motion which the scanning base 136 is required to produce for the assumption of the home position.

A sub-routine for the calculation of the home position at Step S16 is illustrated in FIG. 28. At Step S31, the direction of the motion which is required in allowing the controlling plate 160 to assume the home position from the ON-OFF status of the direction sensor SD is discerned. In other words, the direction of motion is discerned to be toward the left when the scanning base 136 is stopped at Step S15 and the controlling plate 160 is consequently brought to the position shown in FIG. 33C and the direction is discerned to be toward the right when the controlling plate 160 assumes the position shown in FIG. 34C. When the direction of motion is discerned to be toward the left at Step S31, Step S32 checks whether the direction of said motion for compensation is toward the right or the left from the design value. The value of compensation is added to ½ of the found length G between the edges when the direction is discerned to be toward the left (Step S33) or the value of compensation is subtracted from ½ of the found length G between the edges when the direction is discerned to be toward the right (Step S34). When the direction of motion is discerned to be to the right at Step S31, the operations of Steps S35 to S37 are similarly executed to effect calculation of the distance to the home position.

When the home position is determined by this calculation, Step S17 shown in FIG. 27 is executed to start the motion of the scanning base 136. Since the home sensor SH is already in the "ON" status prior to the start of this motion, this motion of the scanning base 136 first induces the sensor SH to assume the "OFF" status at Step S18 and, at the same time, the distance of motion is calculated at Step S19 based on the predetermined distance to the home position. Gradual decrease of the calculated distance of motion is started at Step S20. When the completion of this subtraction is discerned at Step S21, the motion of the scanning base 136 is stopped at Step S22. As a result, the scanning base 136 is set at the prescribed home position. The signal indicative of this fact is transmitted to the master CPU 181 at Step S23.

Figure 29:
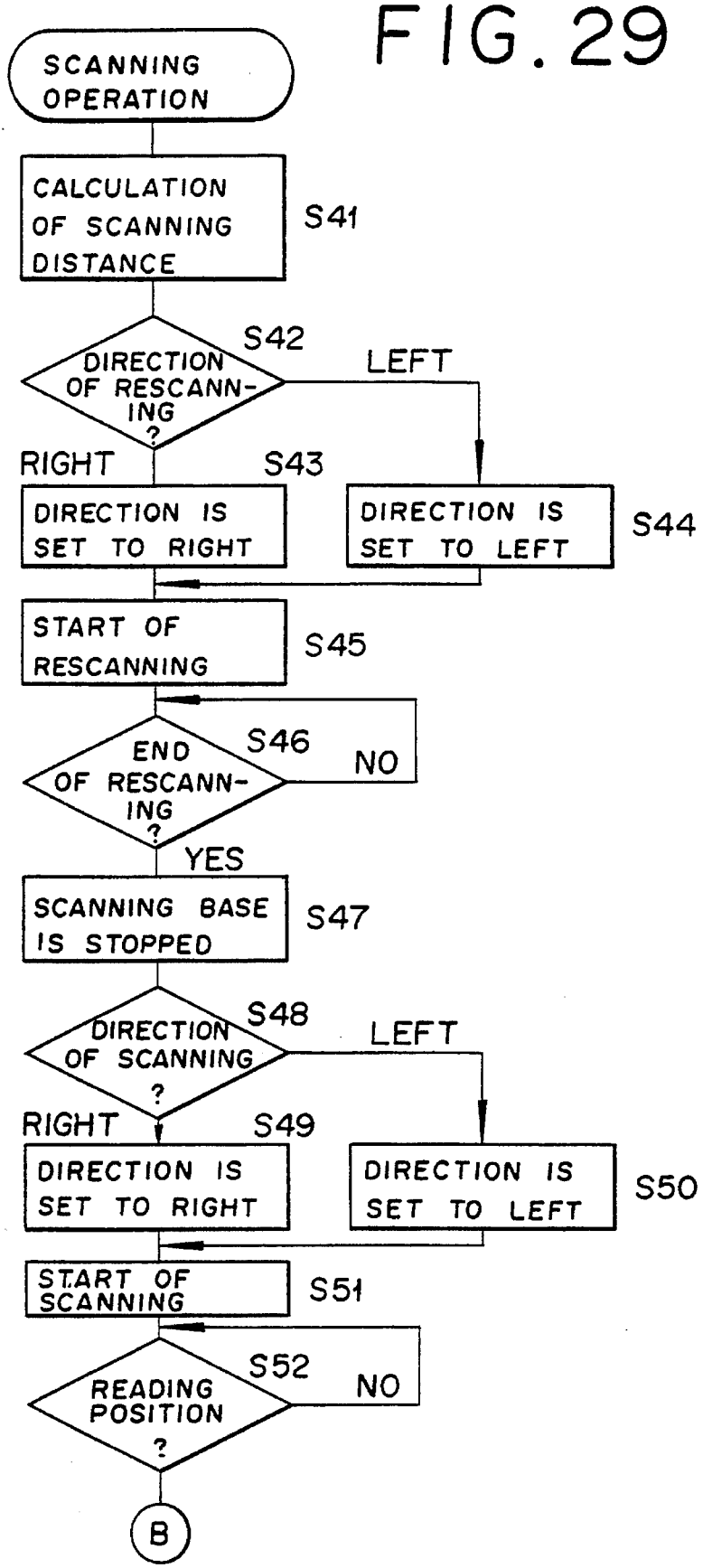
FIG. 29 is a flow chart showing an image scanning operation.
Figure 30:
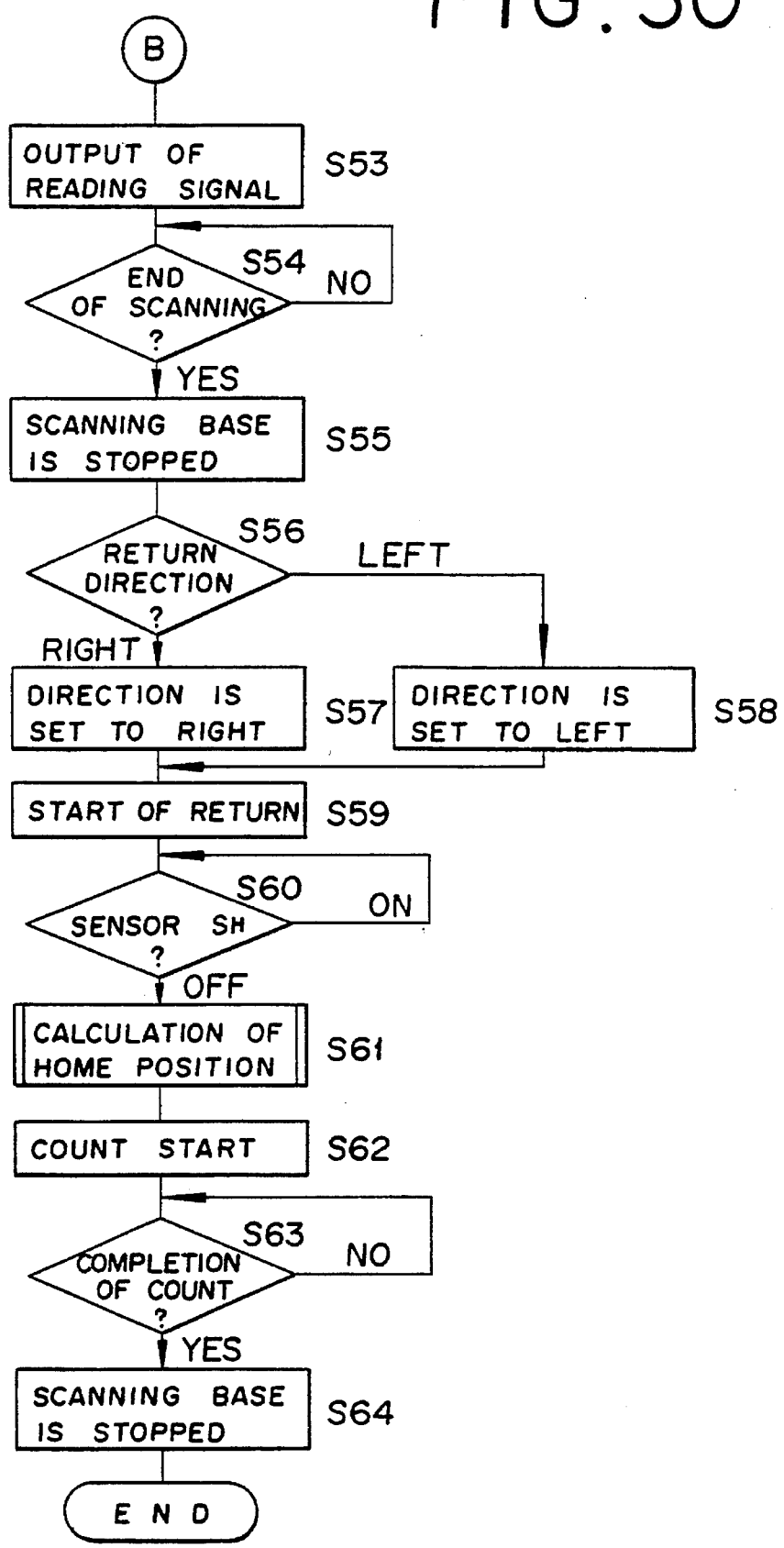
FIG. 30 is a flow chart showing another image scanning operation.
Figure 31:
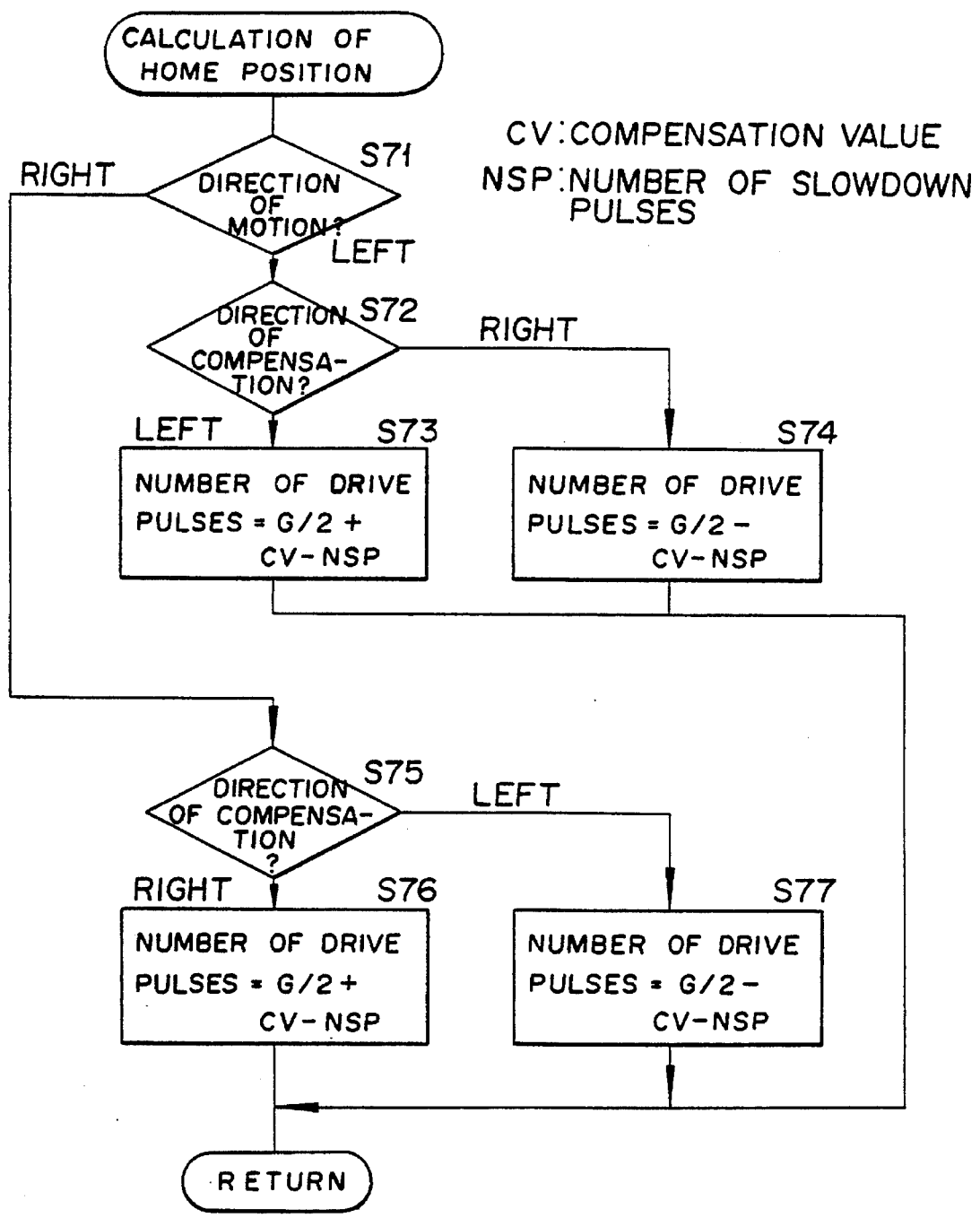
FIG. 31 is a flow chart showing a sub-routine for the step for calculation of a home position in FIG. 30.

Now, the operation of reading an image from a film by the use of the image reading apparatus will be described below with reference to the flow charts illustrated in FIGS. 29 to 31. The reading of the image is started by means of the read start button 173 on the operating panel 170 illustrated in FIG. 24. Before the signal of starting the image reading is transmitted to the master CPU 181, the data on output size, magnifications, and direction of reading produced by the manipulation of the keys on the operating panel 170 are already transmitted to the scanning CPU 183. First, the operation of Step S41 is executed to effect calculation of the distance of motion of the film in the direction of auxiliary scanning which is required for scanning motion. Since the optical axis falls at the center of the film when the controlling plate 160 or the scanning base 136 is already set at the home position, first a rescanning motion is performed and then a scanning motion for image reading is carried out for the purpose of causing the optical axis to emerge from the terminal part of the film. The distances of motion of the film in the scanning and rescanning operation are found by the following formulas using the output size and the magnifications.

Ls (Distance of scanning)=Lo (output side)/M (magnifications)

Lr (Distance of rescanning)=Ls/2

The scanning speed is found by the following formula using the magnifications and the system speed. Vs (Scanning speed)=Vsys(system speed)/M(magnifications)

At Step S42, the operator manipulates either of the keys 177L and 177R on the operating panel 170 to effect discernment of the direction of scanning in accordance with the already introduced direction of auxiliary scanning. When it has been set to perform the reading of an image recorded on the film by moving the scanning base 136 toward the left in the bearings of FIG. 20, the motion of the film or the scanning base 136 toward the right is set at Step S43 for the purpose of aligning the terminal part of the film to the optical axis. When the scanning motion in the opposite direction is already initiated by means of a due input, the motion toward the left is set at Step S44. The motion of the scanning base 136 is started at Step S45. When the completion of the motion of the scanning base 136 over the rescanning distance Lr is discerned at Step S46, the motion is stopped at Step S47. After the direction of scanning has been again discerned at Step S48, the direction of motion of the scanning base 136 is set at Steps S49 and S50. This direction is opposite to the direction of motion in the rescanning operation. When the scanning base 136 moving in the prescribed direction of auxiliary scanning reaches the reading position, the signal for reading is emitted. When the reading of one image is completed (Steps S52, S53, and S54), the scanning base 136 is stopped at Step S55. The image signal so read out is processed, then transmitted to the printer 186, and reproduced on the recording paper in the order in which it was read out. The rescanning and scanning operation are effected solely by means of drive pulses without relying on detection as with a sensor. Then, for the purpose of returning the scanning base 136 to the home position thereof by moving the position of the notch 161 in the controlling plate 160 to the position of the home sensor SH, the direction of return motion is discerned at Step S56 and the return is effected at Step S59 in the direction to be set at Steps S57 and S58. When the position of the edge of the notch 161 is moved to the position of the home sensor SH, the home sensor SH is switched from the "ON" status to the "OFF" status at Step S60. At Step S61, the calculation for determining the home position to which the return is to be made is carried out. A sub-routine for this Step S61 is illustrated in FIG. 31. This sub-routine is substantially the same as the sub-routine shown in FIG. 28. The operations of Steps S71 to S77 are executed to effect discernment of the direction of return and the direction of compensation and the numeber of drive pulses to be fed to the motor 143 for driving the scanning base 136 is calculated. For the purpose of returning the scanning base 136 quickly unlike the return made in the case illustrated in FIG. 28, the number of slowdown pulses equaling the slowdown distance K mentioned above is subtracted at Steps S73, S74, S76, and S77. When the fact that the number of pulses determined by the calculation at Step S61 has been completely transmitted to the motor 143 is discerned, the motion of the scanning base 136 is stopped at the moment that the count of these pulses is completed (Steps S62 to S64). Thus, the motion in the return direction is not controlled solely by the number of pulses but is effected by a procedure which consists of determining the scanner position by the detection of the edge with the home sensor SH, effecting the preset slowdown control from that position, and after completion of the slowdown operation, effecting the compensation of the home position by the calculation of the value of compensation based on the predetermined edge length in due consideration of the direction of return.

The illustrated embodiment has been depicted as using an aperture card AP as a film having image information recorded thereon. This invention is similarly embodied even when the image information recorded on a microfilm such as a microfiche film is read out. As concerns the mode of film scanning, the illustrated embodiment relies on the film carrier part 23 for the motion of the film. Other mode of scanning such as a mirror scanning may be adopted instead for the image reading apparatus of this invention.

While this invention has been illustrated and described in accordance with a preferred embodiment, it is recognized that variations and changes may be made and equivalents employed herein without departing from the invention as set forth in the claims.

We claim:

1. An image reading apparatus, comprising:

image projecting means for projecting a beam of light containing image information of a prescribed line from an original;

a separating member for separating said beam of light projected by said image projecting means into a first direction and a second direction;

a first image reading member for reading out a portion of said prescribed line contained in the beam of light separated into said first direction by said separating member;

a second image reading member disposed at an equivalent position to said first image reading member relative to said separating member and adapted to read out a portion of said prescribed line contained in the beam of light separated into said second direction by said separating member; and supporting means for integrally supporting said separating member, said first image reading member, and said second image reading member as one unit.

2. An image reading apparatus according to claim 1, which further comprises adjusting means for adjusting the position of said first image reading member relative to said second image reading member.

3. An image reading apparatus according to claim 2, wherein said first image reading member reads out the portion of said image information equaling half the length of said prescribed line and said second image reading member reads out the portion of said image information equalling the remaining half of said prescribed line.

4. An image reading apparatus according to claim 1, wherein a length of an optical path from the separating member to the first image reading member and a length of an optical path from the separating member to the second image reading member are substantially the same.

5. An image reading apparatus according to claim 2, wherein said first image reading member and said second image reading member comprise units composed of a plurality of read out elements and said units are disposed in a zigzag configuration.

6. An image reading apparatus according to claim 1, wherein said first image reading member and said second image reading member comprise units composed of a plurality of read out elements and said units are disposed in a zigzag configuration.

7. An image reading apparatus, comprising:

image projecting means for projecting a beam of light containing image information of a prescribed line from an original;

a separating member for separating said beam of light projected by said image projecting means into a first direction and a second direction;

a first image reading member for reading out a portion of said prescribed line contained in the beam of light separated into said first direction by said separating member;

a second image reading member disposed at an equivalent position to said first image reading member relative to said separating member and adapted to read out a portion of said prescribed line contained in the beam of light separated into said second direction by said separating member; and image processing means provided with a plurality of image processing parts and adapted to effect parallel processing of the portions of image information read out by said first image reading member and said second image reading member.

8. An image reading apparatus according to claim 7, wherein said image processing means causes the image information read out by said first image reading member and second image reading member to be emitted as one line of image data.

9. An image reading apparatus according to claim 8, which further comprises scanning means for scanning an original projected by said image projecting means in a direction of auxiliary scanning which is perpendicular to the projected line and selecting means for selecting the direction of scanning by said scanning means between a first direction and a second direction opposite to said first direction.

10. An image reading apparatus according to claim 7, wherein a length of an optical path from the separating member to the first image reading member and a length of an optical path from the separating member to the second image reading member are substantially the same.

11. An image reading apparatus according to claim 7, wherein said first image reading member and said second image reading member comprise units composed of a plurality of read out elements and said units are disposed in a zigzag configuration.

12. An image reading apparatus, comprising:
- an image reading member provided with a plurality of photoelectric conversion elements arranged in a linear state and adapted to read out projected image information of an original;
- scanning means for effecting scanning by the relative motion of said image reading member and the projected image of said original, the direction of said relative motion being perpendicular to the direction of arrangement of said photoelectric conversion elements of said image reading member;
- selecting means for selecting the direction of scanning of said scanning means between a first direction and a second direction opposite to said first direction; and
- output means for emitting the image information read out by said image reading member in the order in which said image information was read out.

13. An image reading apparatus according to claim 12, wherein said relative motion of said scanning means is effected by the motion of said original.

14. An image reading apparatus according to claim 12, which further comprises home position setting means for setting a home position destined to form the standard for the scanning by said scanning means.

15. An image reading apparatus according to claim 14, wherein said home position is the position at which said image reading member coincides with the central position of the projected image of said original.

16. An image reading apparatus according to claim 14, wherein said scanning means incorporates therein a stepping motor and the amount of relative motion from the home position is controlled by means of the number of pulses for motor driving.

17. An image reading apparatus according to claim 14, wherein said home position setting means includes a plate member having a notch portion and a sensor for detecting said notch portion, said plate member and said sensor are relatively moved with scanning of said scanning means.

18. An image reading apparatus according to claim 17, wherein said home position setting means further include detecting means for detecting the deviating direction from the home position and calculating means for calculating a value of compensation based on output of the sensor and detection of the detecting means.

* * * * *

UNITED STATES PATENT AND TRADEMARK OFFICE
CERTIFICATE OF CORRECTION

PATENT NO.    : 5,488,490
DATED         : Jan. 30, 1996
INVENTOR(S)   : Kenji SAWADA et al.

It is certified that error appears in the above-indentified patent and that said Letters Patent is hereby corrected as shown below:

On the title page, item [75]:

Delete "Sei Onuma, Tokyo," from the inventors.

Signed and Sealed this

Third Day of December, 1996

Attest:

BRUCE LEHMAN

*Attesting Officer*        *Commissioner of Patents and Trademarks*